(12) United States Patent
Iwatsubo et al.

(10) Patent No.: US 8,142,300 B2
(45) Date of Patent: Mar. 27, 2012

(54) ANALYSIS METHOD OF GOLF CLUB

(75) Inventors: Takuzo Iwatsubo, Suita (JP); Keiji Moriyama, Kobe (JP); Masanori Yabu, Kobe (JP); Masahide Onuki, Kobe (JP)

(73) Assignees: A School Corporation Kansai University, Suita-shi (JP); SRI Sports Limited, Kobe-shi (JP)

( * ) Notice: Subject to any disclaimer, the term of this patent is extended or adjusted under 35 U.S.C. 154(b) by 0 days.

(21) Appl. No.: 12/078,546

(22) Filed: Apr. 1, 2008

(65) Prior Publication Data

US 2009/0005188 A1 Jan. 1, 2009

(30) Foreign Application Priority Data

Jun. 26, 2007 (JP) ................................. 2007-167895

(51) Int. Cl.
*A63B 53/00* (2006.01)

(52) U.S. Cl. ....................................... 473/222; 473/409

(58) Field of Classification Search .................. 473/221, 473/223, 409, 219, 222, 407; 73/862.042, 73/862.043, 862.451, 862.46
See application file for complete search history.

(56) References Cited

U.S. PATENT DOCUMENTS

| | | | | |
|---|---|---|---|---|
| 3,270,564 A | * | 9/1966 | Evans | ........................... 73/865.4 |
| 3,792,863 A | * | 2/1974 | Evans | ........................... 473/223 |
| 4,137,566 A | * | 1/1979 | Haas et al. | ..................... 473/209 |
| 4,138,118 A | * | 2/1979 | Budney | ......................... 473/202 |
| 5,501,463 A | | 3/1996 | Gobush et al. | |
| 5,575,719 A | | 11/1996 | Gobush et al. | |
| 5,625,577 A | * | 4/1997 | Kunii et al. | ........................ 703/2 |
| 5,772,522 A | * | 6/1998 | Nesbit et al. | ................... 473/222 |
| 5,803,823 A | | 9/1998 | Gobush et al. | |
| 6,213,888 B1 | * | 4/2001 | Kawaguchi et al. | .......... 473/223 |
| 6,241,622 B1 | | 6/2001 | Gobush et al. | |

(Continued)

FOREIGN PATENT DOCUMENTS

JP 7-16321 A 1/1995

(Continued)

OTHER PUBLICATIONS

Partial English language translation of JP-2007-61121-A (Mar. 15, 2007).

*Primary Examiner* — Stephen L. Blau
(74) *Attorney, Agent, or Firm* — Birch, Stewart, Kolasch & Birch, LLP

(57) ABSTRACT

According to the present invention, a torque applied from a golf player to a golf club during a swing is analyzed in a time-series manner. A DLT method is suitable as a determination procedure. Preferably, a link model is used in this analysis. Preferably, the three-dimensional coordinate of the mark provided at a position that corresponds to the link model is determined by a DLT method. Preferable analysis method includes: modeling using a golf club, and at least a part of a golf player who grips a grip member of the golf club to provide a link model in which the golf club is connected with the golf player via a joint; and analyzing the torque that acts on the joint is analyzed during the swing in a time-series manner. This joint is positioned in the vicinity of the grip member. This analysis can be applied to a method of diagnosing a swing, a method of selecting a golf club, and a method of designing a golf club.

9 Claims, 16 Drawing Sheets

U.S. PATENT DOCUMENTS

| | | |
|---|---|---|
| 6,286,364 B1 | 9/2001 | Aoyama et al. |
| 6,314,339 B1 * | 11/2001 | Rastegar et al. ............. 700/260 |
| 6,402,635 B1 * | 6/2002 | Nesbit et al. .................. 473/269 |
| 6,488,591 B1 | 12/2002 | Gobush et al. |
| 6,500,073 B1 | 12/2002 | Gobush et al. |
| 6,533,674 B1 | 3/2003 | Gobush |
| 6,616,543 B1 | 9/2003 | Gobush et al. |
| 6,758,759 B2 | 7/2004 | Gobush et al. |
| 6,764,412 B2 | 7/2004 | Gobush et al. |
| 6,781,621 B1 | 8/2004 | Gobush et al. |
| 7,086,954 B2 | 8/2006 | Gobush et al. |
| 7,086,955 B2 | 8/2006 | Gobush et al. |
| 7,257,237 B1 * | 8/2007 | Luck et al. .................... 382/103 |
| 2002/0119828 A1 * | 8/2002 | Toulon et al. ................. 473/287 |
| 2003/0130054 A1 | 7/2003 | Bissonnette et al. |
| 2004/0259653 A1 | 12/2004 | Gobush et al. |
| 2005/0079932 A1 * | 4/2005 | Voges et al. ................... 473/407 |
| 2005/0114073 A1 | 5/2005 | Gobush |
| 2005/0255932 A1 * | 11/2005 | Erickson et al. ............. 473/266 |
| 2006/0281572 A1 | 12/2006 | Gobush et al. |
| 2008/0182685 A1 * | 7/2008 | Marty et al. .................. 473/407 |
| 2011/0092260 A1 * | 4/2011 | Murdock et al. ................. 463/3 |

FOREIGN PATENT DOCUMENTS

| | | |
|---|---|---|
| JP | 2000-66315 | 3/2000 |
| JP | 3401194 B2 | 2/2003 |
| JP | 2004-242855 A | 9/2004 |
| JP | 2004-344418 A | 12/2004 |
| JP | 2007-61121 A | 3/2007 |

* cited by examiner

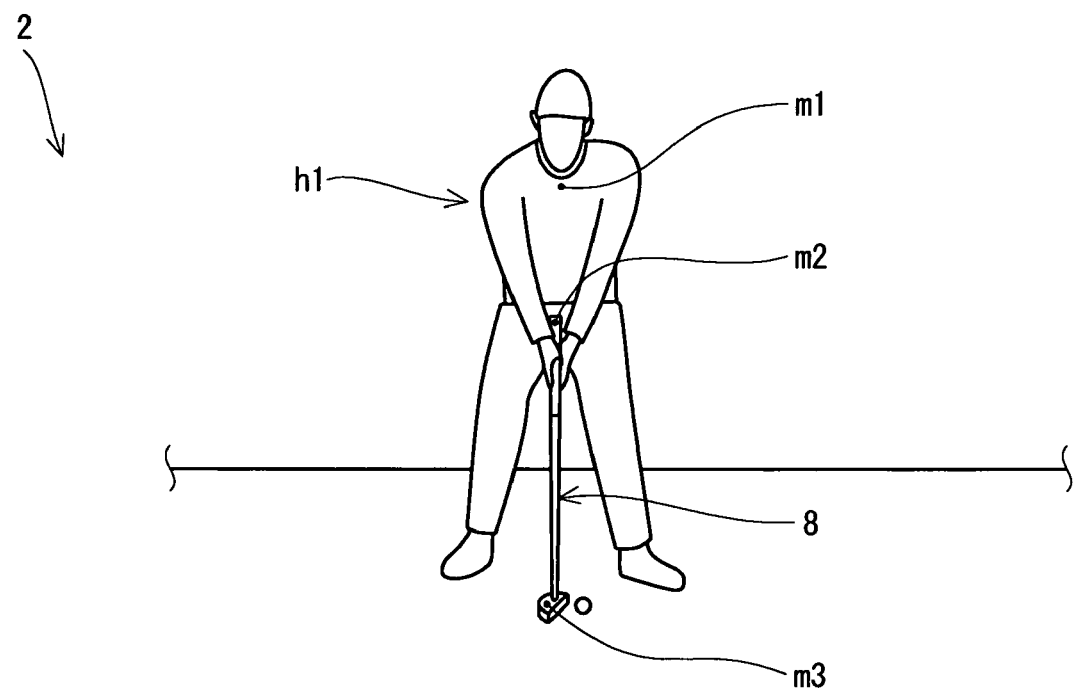
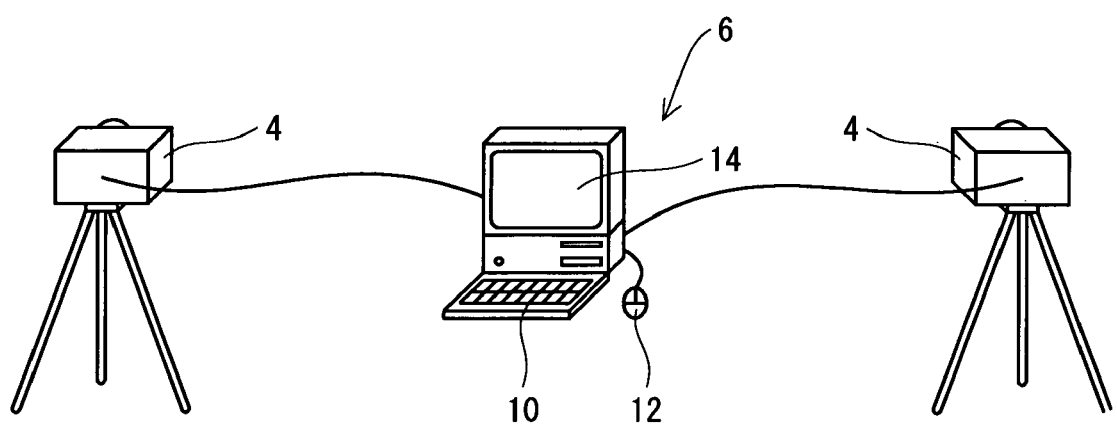
Fig. 1

Fig. 11A      1) torque around the A axis
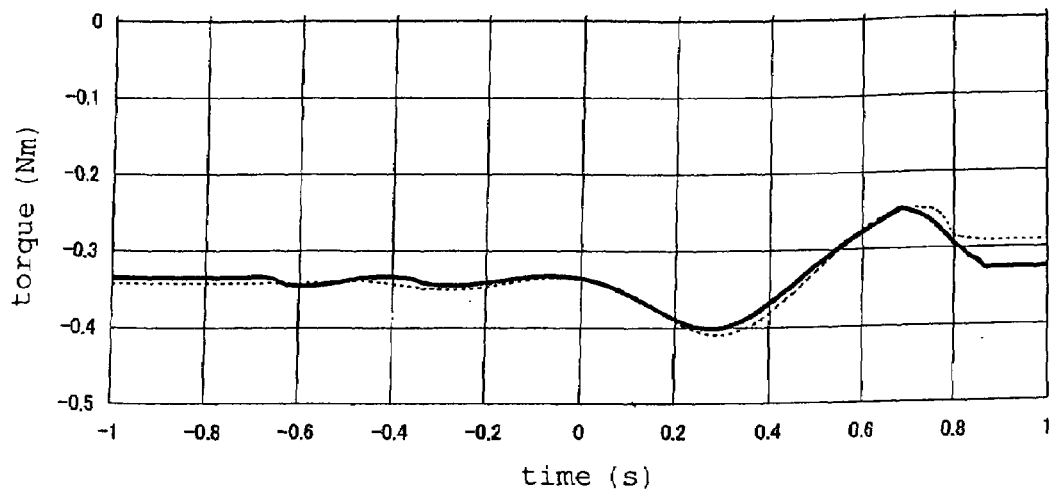
Fig. 11B      2) torque around the B axis
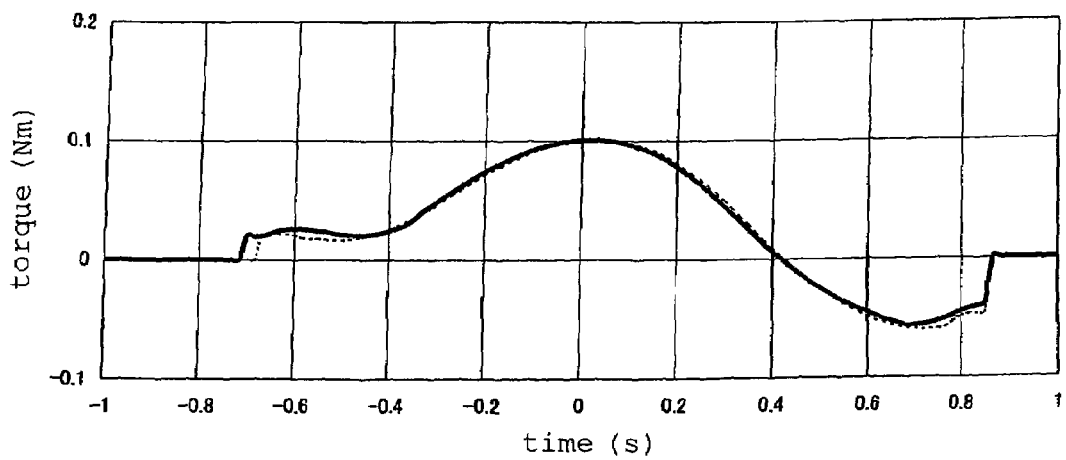
Fig. 11C      3) torque around the C axis
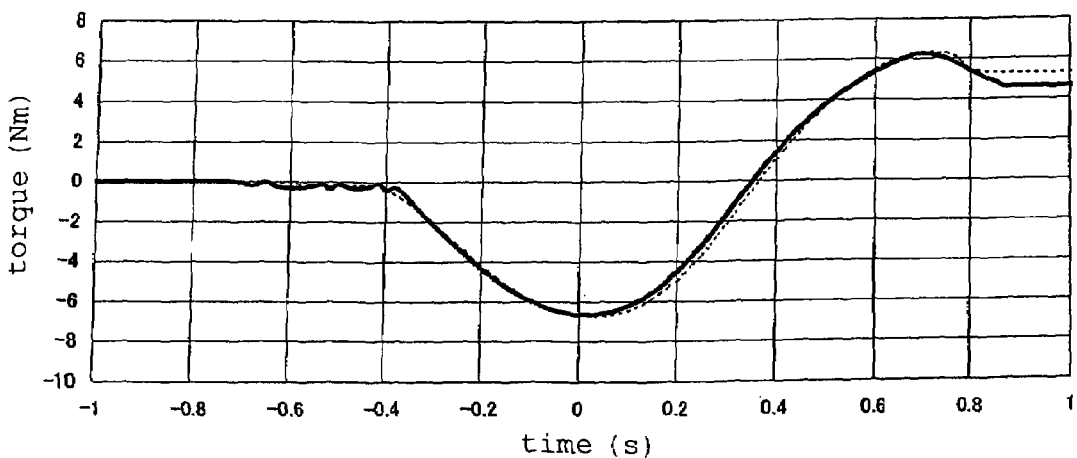

Fig. 12A    1) torque around the A axis
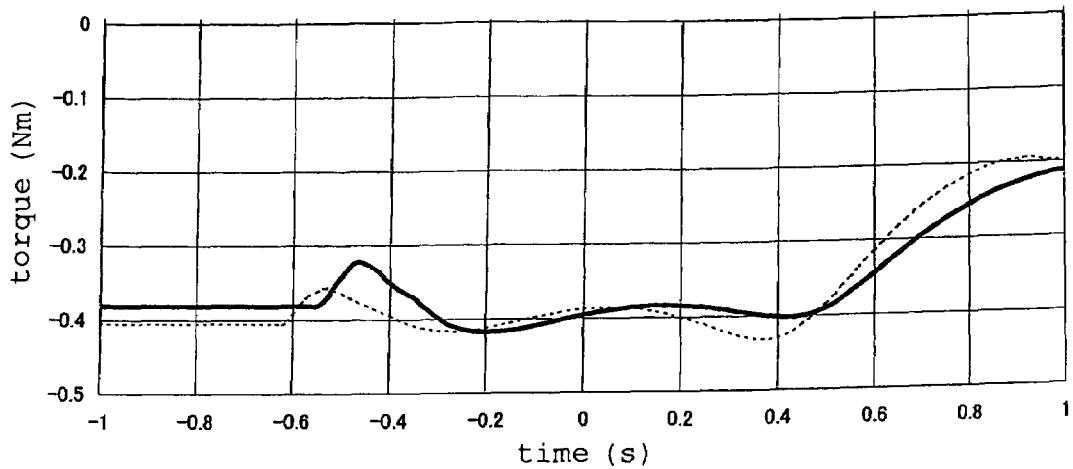
Fig. 12B    2) torque around the B axis
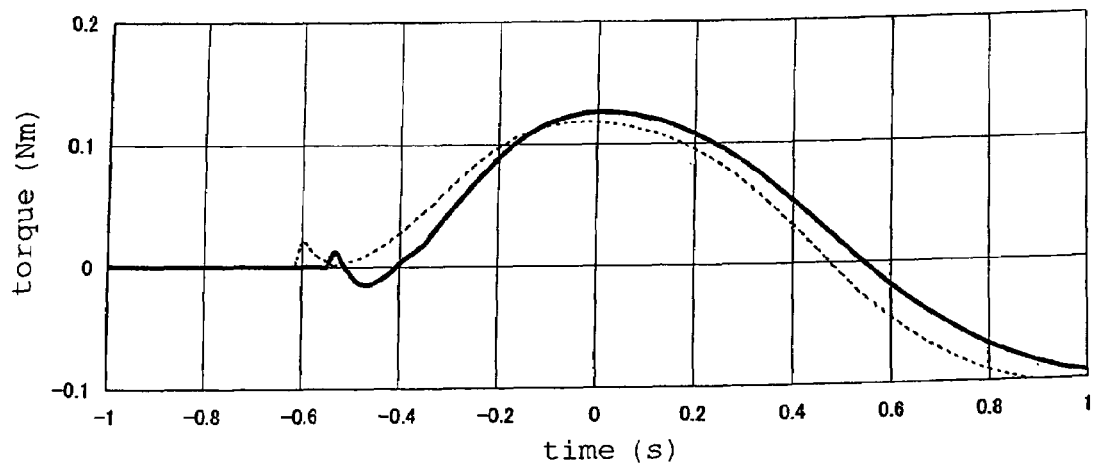
Fig. 12C    3) torque around the C axis
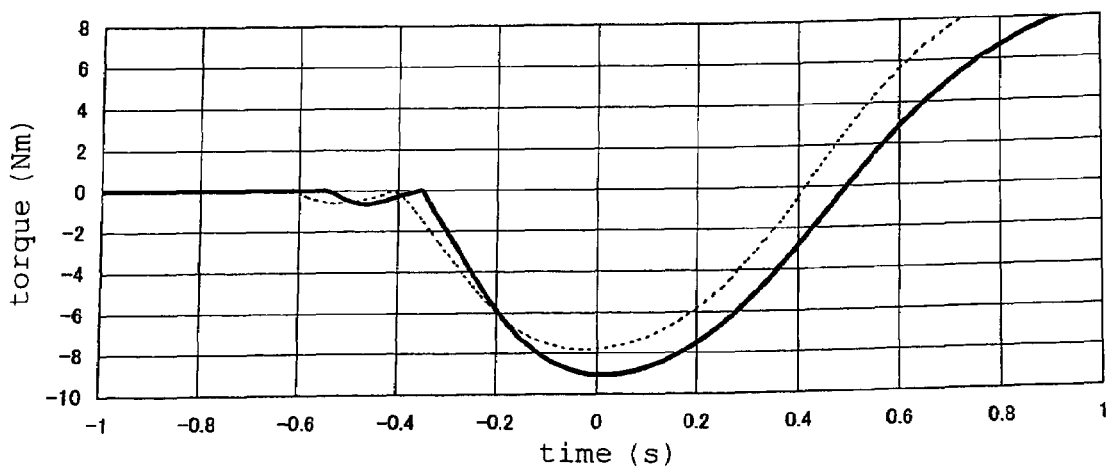

Fig. 13A  1) torque around the A axis
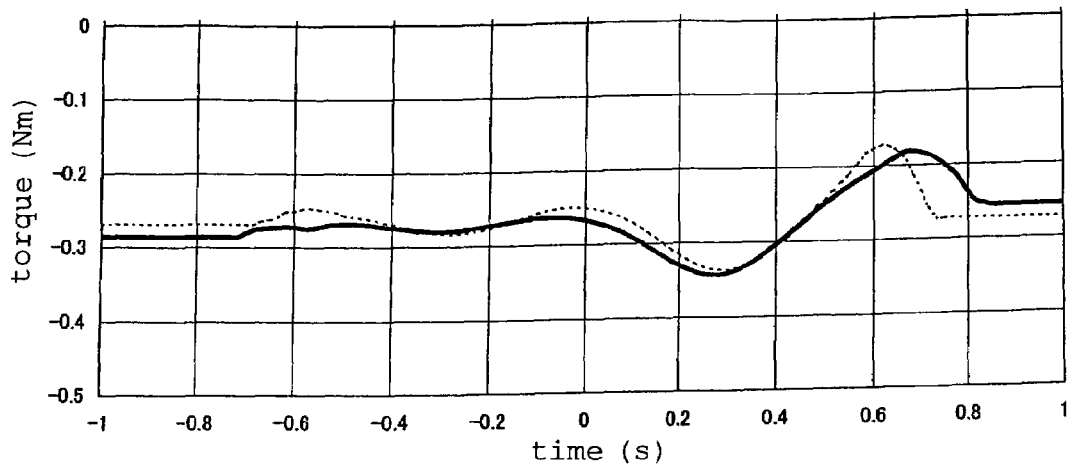
Fig. 13B  2) torque around the B axis
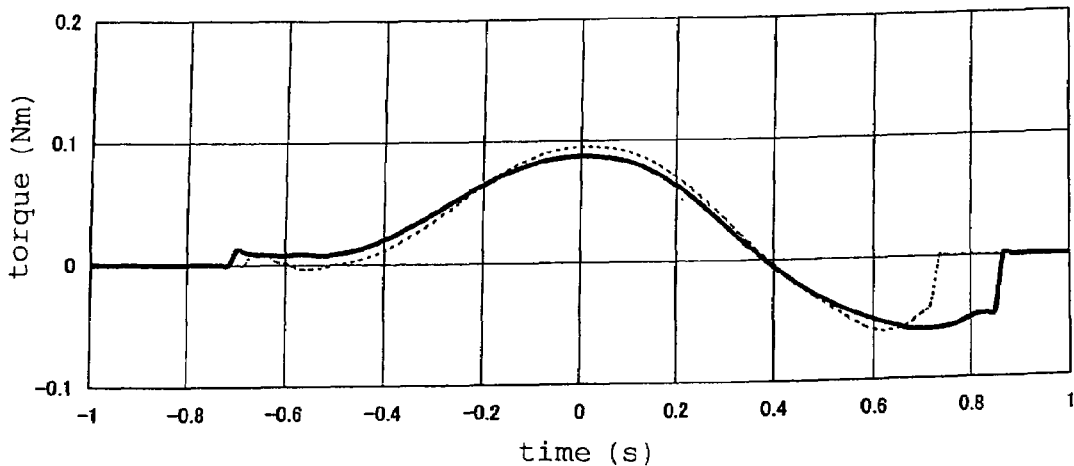
Fig. 13C  3) torque around the C axis
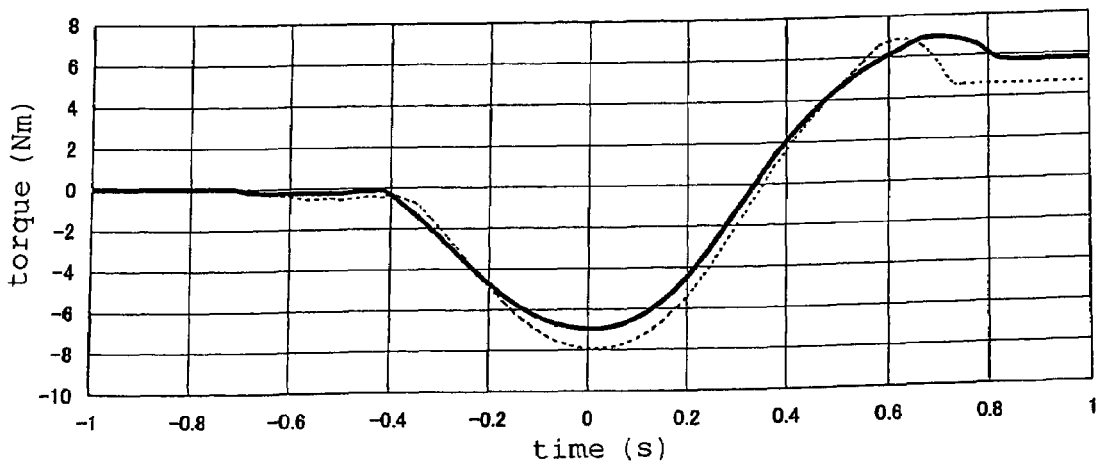

1) torque around the A axis 2) torque around the B axis 3) torque around the C axis 1) torque around the A axis 2) torque around the B axis 3) torque around the C axis Fig. 16A      1) torque around the A axis
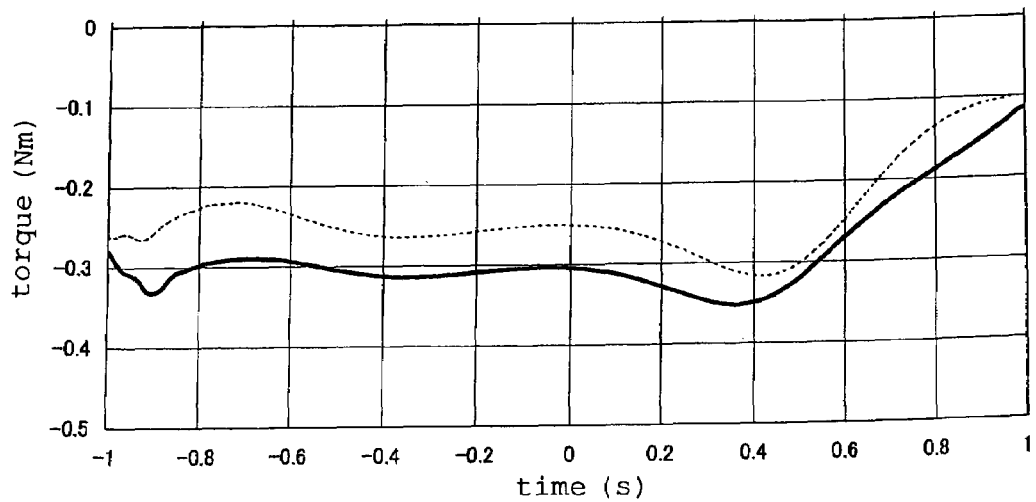
Fig. 16B      2) torque around the B axis
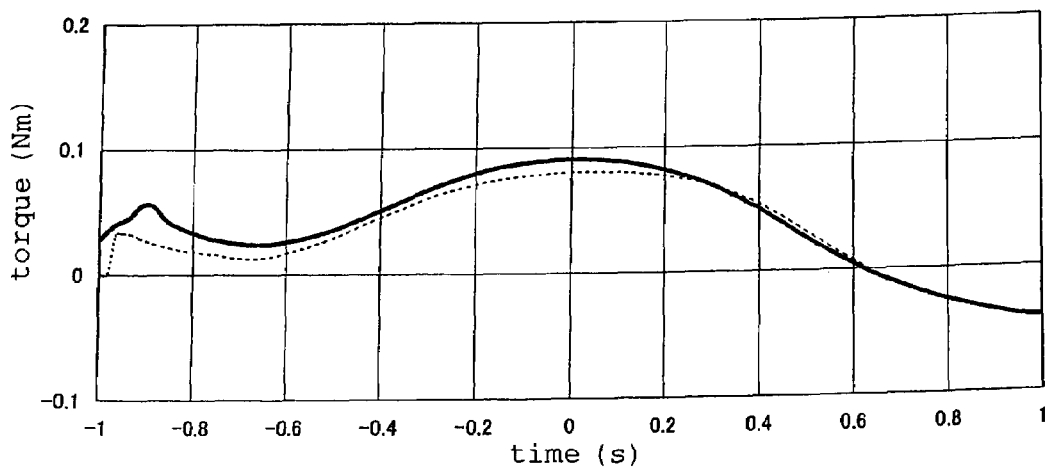
Fig. 16C      3) torque around the C axis
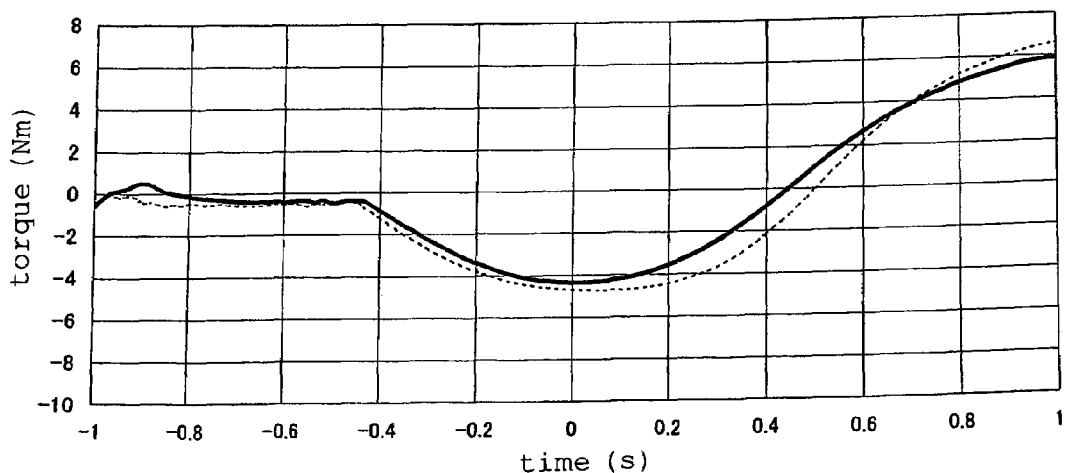

ANALYSIS METHOD OF GOLF CLUB

This application claims priority on Patent Application No. 2007-167895 filed in JAPAN on Jun. 26, 2007. The entire contents of this Japanese Patent Application are hereby incorporated by reference.

BACKGROUND OF THE INVENTION

1. Field of the Invention

The present invention relates to a method of dynamically analyzing golf clubs.

2. Description of the Related Art

Conventionally, analyses of dynamic behaviors of golf balls or golf clubs have been attempted. Japanese Patent No. 3660248 discloses a system for determining flight trajectory and the like of golf balls. Japanese Patent No. 3401194 discloses a determination method for deciding behavior of golf club heads by using multiple cameras. Analyses of dynamic behaviors can reveal functions of golf clubs and the like which cannot be known from static characteristics. Such analyses of dynamic behaviors are important in elucidating characteristics of golf clubs and golf balls.

SUMMARY OF THE INVENTION

In conventional analyses of dynamic behaviors of golf clubs, for example, trajectory of the head, orientation of the face immediately before the impact, and the like are determined. In the determination of the behavioral analyses, states resulting from a swing of the head and the like are decided.

In the aforementioned analyses in conventional arts, the states of a golf club or a head are merely determined. In such conventional analyses, relative relationships between the golf club and a golf player (human body) are uncertain. In the present invention, a dynamic analysis method distinct from conventional methods has been studied based on a novel technical idea. Consequently, a novel technical idea was attained, i.e., to analyze a torque that acts on the golf club during the swing.

An object of the present invention is to provide a method and the like for analyzing dynamic behaviors of golf clubs in which a torque that acts on the golf club is analyzed.

In one aspect of the present invention, there is provided a method of analyzing a golf club in which a torque applied from a golf player to the golf club during the swing is analyzed in a time-series manner.

In other aspect of the present invention, a method of analyzing a golf club is provided which includes modeling using the golf club, and at least a part of a golf player who grips a grip member of the golf club to provide a link model in which the golf club is connected with the golf player via a joint, and analyzing the torque that acts on the joint is analyzed during the swing in a time-series manner.

In another aspect of the present invention, a method of diagnosing a swing is provided in which a result of hitting achieved by a golf player through hitting taking aim at a target is compared with a result of a time-series analysis of the torque applied from the golf player to the golf club during the swing in the hitting.

In yet another aspect of the present invention, a method of diagnosing a swing is provided in which a predetermined optimum torque curve is compared with an observed torque curve obtained by a time-series analysis of the torque applied from a golf player to a golf club during the swing.

In other aspect of the present invention, there is provided a method of selecting a golf club including: hitting multiple golf clubs to obtain results of time-series analyses of the torque applied from a golf player to the golf club during a swing, thereby deriving a torque curve for each golf club based on these analysis results; and comparing a predetermined optimum torque curve with the torque curves for each club, respectively, to select an optimum golf club from among the multiple golf clubs.

In a further aspect of the present invention, there is provided a method of designing a golf club including: hitting of multiple golf clubs by multiple golf players, respectively, to analyze results of time-series analyses of the torque applied from the golf player to the golf club during the swing in the hitting, thereby obtaining multiple observed torque curves based on the analysis results; evaluating the observed torque curve using at least one of the multiple observed torque curves; and designing a golf club based on the evaluation result.

Analysis of the torque that acts on a golf club during the swing enables to obtain the information on the torque applied from the golf player to the golf club. Accordingly, a variety of information can be obtained which was not available by merely analyzing the dynamic behavior of a golf club.

BRIEF DESCRIPTION OF THE DRAWINGS

FIG. 1 shows a schematic view illustrating an example of the determination procedure according to the analysis method of the present invention;

FIG. 11A, FIG. 11B and FIG. 11C shows graphs illustrating the torque curve of Example 1;

FIG. 12A, FIG. 12B and FIG. 12C shows graphs illustrating the torque curve of Example 2;

FIG. 13A, FIG. 13B and FIG. 13C shows graphs illustrating the torque curve of Example 3;

FIG. 16C shows graphs illustrating the torque curve of Example 6.

DESCRIPTION OF THE PREFERRED EMBODIMENTS

Figure 2A:
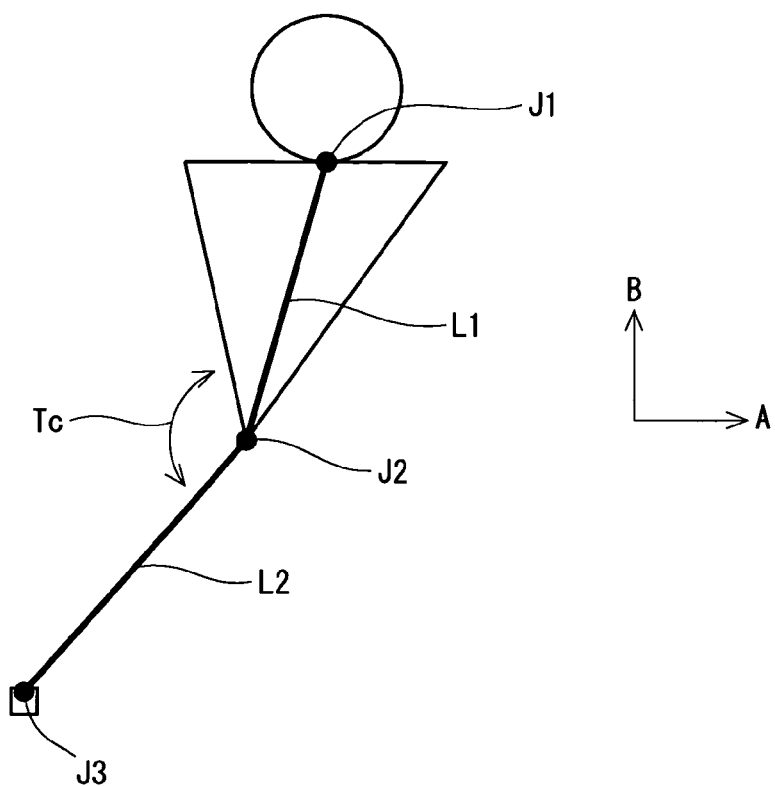
FIG. 2A and FIG. 2B shows a diagrammatic view for explaining a two-link model according to one embodiment.

Hereinafter, the present invention will be explained in detail by way of preferred embodiments with appropriate reference to the accompanying drawings.

FIG. 1 shows a schematic view illustrating one embodiment of the determination for carrying out the method of analyzing a golf club the present invention. In the determination according to the present invention, behaviors of the golf club and golf player (subject) during the swing are determined. Preferably, in the determination according to the present invention, three-dimensional coordinates of the golf club and the golf player (subject) during the swing are determined in a time-series manner. The three-dimensional coordinate may be determined at one or more places on the golf club, and at one or more places on the subject. Herein, the person who swings the club is also referred to as golf player, subject or human body.

In the determination of the three-dimensional coordinate, a DLT (Direct Linear Transformation) method is preferably employed. The DLT method is described in, for example, Japanese Unexamined Patent Application Publication No. 2004-344418. The DLT method is generally used in the field of biomechanics, in particular. In the DLT method, a three-dimensional spatial coordinate is obtained using multiple pictorial images drawn as viewed from different directions. According to the DLT method, the three-dimensional coordinate is reconstructed on the basis of the pictorial image at a point the three-dimensional coordinate of which is known (control point). The DLT method is not limited in terms of positioning of the camera, and thus very versatile. In addition, the DLT method is advantageous in that necessity of information about the position of the camera in real space, constants for the camera such as direction of the optical axis, focal distance of the lens, and the like can be avoided.

In the determination, it is preferred that markers be attached to given places on the human body, and given places of the golf club, whereby the motion of the markers is determined. In the analysis of the motion, it is preferred that the analysis be carried out based on the determination results of the motion of the markers. The marker serves in highlighting the given places on the human body or the golf club in the pictorial image, thereby capable of facilitating the analyses such as pictorial image processing and the like. In addition, use of the marker as a standard can simplify the computing, and the analyses of the human body motion can be readily performed with good accuracy. More preferably, the three-dimensional coordinate of the markers may be determined by the DLT method.

The embodiment shown in FIG. 1 illustrates determination system 2 of the three-dimensional motion in which the DLT method is used. This determination system 2 constitutes a three-dimensional motion determination apparatus. This determination system 2 includes multiple cameras 4, computer 6, multiple markers, and golf club 8. The camera 4 is a high-speed camera. In this embodiment, marker m1, marker m2 and marker m3 are used as the multiple markers.

The multiple cameras 4 are connected to computer 6. The computer 6 has a control section although not shown in the figure. This control section controls the multiple cameras 4 in a manner to enable synchronous photographing. The computer 6 has a storage unit in which an analysis program according to the DLT method is stored, and an arithmetic logical unit. Typical storage unit may be a hard disk. Typical arithmetic logical unit may be CPU. In addition, the computer 6 has keyboard 10 and mouse 12 as an input unit, and display 14 as a display unit. Separately from the computer 6, a computer for analyses may be used for calculating the three-dimensional coordinate.

The multiple cameras 4 are provided at different positions to one another. In this embodiment, two cameras 4 are used. Three or more cameras 4 may be used. Each of the multiple cameras 4 is provided such that photographs of the overall picture of the swing can be taken. Each of the multiple cameras 4 is provided such that photographs of all markers can be taken in whole swing. In this embodiment, the golf club 8 is a putter club. In this embodiment, human body h1 performs putting. In this embodiment, an analysis of the putter club is carried out. The golf club 8 may be any golf club other than the putter club.

At least one marker is provided on the human body h1. In the embodiment shown in FIG. 1, marker m1 is provided on the human body h1. This marker is provided on, for example, the skin or clothes of the human body. At least one marker is provided on the golf club 8. In the embodiment shown in FIG. 1, marker m2 is provided on the grip member of the golf club 8. More particularly, the marker m2 is provided on the grip end of the golf club 8. The marker m2 may be positioned in the vicinity of the grip member of the golf club 8. For example, the marker m2 may be attached to the wrist or back of the gripping hand. Furthermore, marker m3 is provided on the head of the golf club 8. More particularly, the marker m3 is provided on the crown of the head. It is acceptable that the marker m3 is positioned in the vicinity of the head of the golf club 8, and thus it may be positioned on, for example, the boundary between the shaft and the head. Also, the marker m3 may be provided on the shaft of the golf club 8.

The shape and the size of the marker are not limited. The marker may be, for example, a hemispherical substance. For the purpose of facilitating the processing of the pictorial image, the marker may have a distinctive color such as e.g., white or a fluorescent color. In light of diminishing the influence exerted on the swing, the marker is preferably lightweight. For example, the marker is preferably constituted from expanded polystyrene or the like. In FIG. 1, the marker m1, the marker m2 and the marker m3 are denoted by filled circles. The position and the number of the marker are not limited. When the motion is analyzed by the link model described later, the position and the number of the marker may be determined so as to provide corresponding to the used link model.

In the analysis of the motion, it is preferred to use a link model (rigid body multi-link model). Use of the link model leads to simplification of the complicated motion of the human body. Further, use of the link model leads to simplification of the computing, whereby the analysis of the motion of the human body can be readily performed with good accuracy. It is also acceptable to analyze the pictorial image itself of the human body and golf club without using the link model.

Since an error can be caused between the human body h1 and the link model, a correction means may be employed for correcting this error. For example, a correction means may be employed taking into consideration that the distances between the marks attached to the human body h1 are not always constant. As such a correction means, for example, a first correction means may be employed in which: observed value li of the length of each link is compared with link standard length Li that is the length of the link measured in a static state; error $\delta Li$ between the observed value li and the link standard length Li is calculated; and the first correction is carried out at each measured marker position such that the error $\delta Li$ falls within a given error range. Moreover, a second correction means may be also employed considering possible discontinuity of the motion of each marker, in addition to the first correction means. As this second correction means, any means for carrying out the second correction on each measured marker position may be employed such that, for example, smooth motion of each marker after the first correction can be attained following the first correction. The first correction means is employed to the effect that the length of the link between each marker is corrected to be constant irrespective of the time. In addition, according to the second correction means, expectation for smooth movement of the joint position is considered in view of smooth motion of the human body h1. These first correction and second correction are described in detail in Japanese Unexamined Patent Application Publication No. 2007-61121.

According to the first correction, the positions of the markers at both ends of the link are corrected to make the observed value li consistent with the standard length Li. For example, the positions of the markers at both ends of the link are corrected to, for example, positions including each half of the error δLi added to the observed value li for the both ends. The error δLi is positive when Li is greater than li, and the arithmetic addition is conducted on the link length. To the contrary, the error δLi is negative when Li is smaller than li, and the arithmetic subtraction is conducted on the link length. In this case, each half of the error between the link standard length and the observed value of the length of the link is added to the marker positions at both ends of the link, respectively, whereby the correction is made to the link length approximately equal to the link standard length. Therefore, the observed value li of the link length can be made substantially consistent with the link standard length Li.

In the first correction process, the correction is carried out independently at every sampling time point tm, therefore, the three-dimensional coordinate of each marker over time is not continuous in the time series. Accordingly, it is desired to carry out the second correction such that the coordinate of each marker becomes continuous with respect to the time. This second correction is preferably carried out so as not to alter the length of the link corrected in the first correction. Thus, the effect achieved by the first correction is not impaired. In this second correction, for example, the coordinate system of each marker is subjected to coordinate transformation to give a polar coordinate system on the spherical surface, and thereafter a correction is executed so as to follow a given equation of higher degree. In this case, transformation of the coordinate system of each marker to give the polar coordinate system on the spherical surface enables the link length to be corrected to follow a given equation of higher degree while preventing a certain condition in the first correction from being disrupted. Curve fitting is perfected by this second correction.

The first correction and the second correction are highly advantageous in three- or higher-link models because there is a link to which other links are connected at both ends thereof in the three- or higher-link models. In contrast, according to the two-link model as in this embodiment, comparatively low advantages of the first correction and the second correction are attained because there is no link to which other links are connected at both ends thereof. In light of contemplation to perform balancing of the analysis accuracy, and deterioration of the analysis efficiency resulting from the complication of the calculation, the first correction and the second correction may not be employed in two-link models.

In this embodiment, the torque at the joint of the link model is analyzed. In this embodiment, an analysis system of the three-dimensional motion, and a link model analysis system which can analyze the torque in the link model are used. This link model analysis system has a storage unit, an arithmetic logical unit, an input unit and an output unit. The information on the torque applied from the human body (golf player) to the golf club can be obtained by this analysis. A link model which enables a torque that acts on a golf club to be analyzed is to be chosen.

During the swing, the golf player takes a swing while gripping the golf club grip. The golf player transfers the force to the golf club through the grip. The force that acts on the golf club during the swing is the gravity, and a force applied from the golf player. By analyzing the torque that acts on the grip member, the torque applied by the golf player to the golf club can be analyzed.

As the link model that enables the torque that acts on the grip member to be analyzed, a link model can be chosen which has a joint at least in the vicinity of the grip member. Preferable link model has a club-corresponding link which corresponds to the golf club, and a human body-corresponding link which connects to the club-corresponding link via a joint. This human body-corresponding link corresponds to the human body at least in part. The human body-corresponding link may be further connected to other link. The joint that connects the club-corresponding link with the human body-corresponding link is positioned in the vicinity of the grip member. The torque that acts on this joint is analyzed. On the basis of this torque, the torque applied by the golf player to the golf club can be analyzed. To analyze the torque that acts on the joint of the link model is one example of analysis of the torque that acts on the grip member of the golf club.

The number of the links in the link model is not particularly limited. Examples of the link model which can be used in the present invention include two-link model having two links, three-link models having three links, four-link models having four links, and the like. A link model having five or more links is also acceptable.

When a four-link model is used as the link model, the marker may be attached to, for example, neck, shoulder, elbow, wrist and club head.

In the link model, a link to the human body, and a ling corresponding to the golf club are necessary. Thus, the number of the links is at least 2 or more. As the number of the links is large, the number of the links corresponding to the human body can be increased, whereby a link model more approximate to the human body can be formed. However, the larger link number leads to requirement for complicated calculation, thereby resulting in reduced analysis efficiency. Taking into account the analysis efficiency, the number of the links is preferably equal to or less than five, and more preferably equal to or less than 4. Additionally, in the putting using a putter club, flex behavior in the area from the shoulder to the golf club head is comparatively small. Therefore, in the analysis of a putter club, in particular, preferably a two-link model or a three-link model, and more preferably a two-link model is used in light of keeping the balance of the analysis accuracy and the analysis efficiency.

Figure 2B:
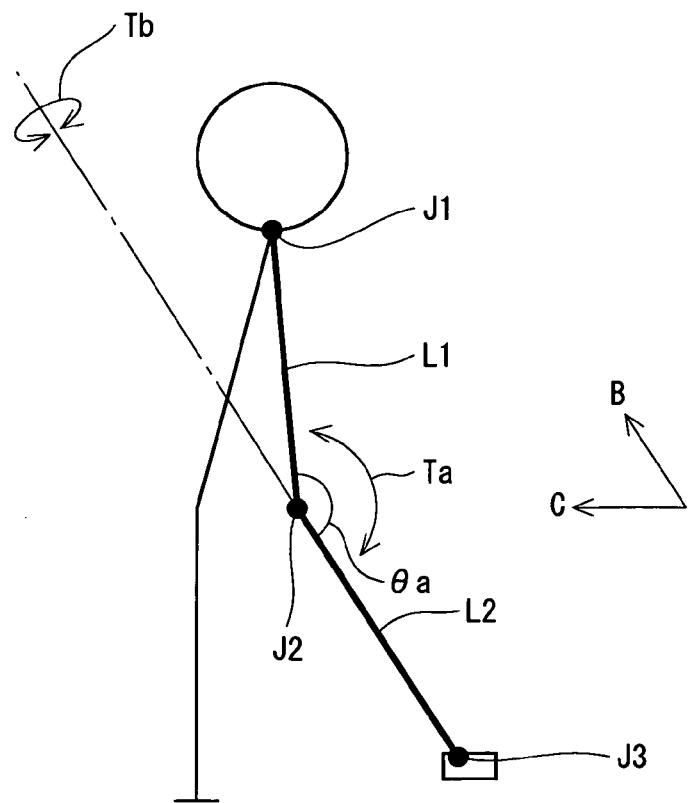

In this embodiment shown in FIG. 1, a two-link model (rigid body two-link model) is employed. FIG. 2A and FIG. 2B show a schematic view illustrating the two-link model. FIG. 2A shows an illustration of a golf player viewed from the front, and FIG. 2B shows an illustration viewed from behind the hitting direction. FIG. 2B shows the state in addressing. Also, FIG. 2A shows not the state in addressing but the state in the course of downward swinging. In FIG. 2A and FIG. 2B, directions of A axis, B axis and C axis described later are additionally depicted. This two-link model includes first link L1, second link L2, joint J1, joint J2 and joint J3. In FIG. 2A and FIG. 2B, the first link L1 and the second link L2 are shown by a bold line, and joint J1, joint J2 and joint J3 are shown by a filled circle. In FIG. 2A and FIG. 2B, the circular part schematically represents the head of the human body h1; the triangular part schematically represents the shoulder region and arm region of the human body h1; and the square part schematically represents the head of the golf club 8.

The first link L1 is a link that corresponds to a part of the human body. The first link L1 corresponds to the shoulder region and arm region of the human body. The first link L1 is a human body-corresponding link. The second link L2 is a link that corresponds to the golf club 8. The second link L2 is a club-corresponding link.

The position and the number of the marker meet with the two-link model. The joint J1 meets with the marker m1. The joint J2 meets with the marker m2. The joint J3 meets with the marker m3.

The three-dimensional coordinates of the marker m1, marker m2 and marker m3 are obtained in a time-series manner by the DLT method. In the DLT method, a constant representing the relationship of the real spatial coordinate and the coordinate on the pictorial image is determined beforehand. By entering the coordinate on the pictorial image into the transformation formula including the constant, the three-dimensional coordinate in the real space is determined. Based on the determined three-dimensional coordinate, the angle of the joint J2 in the two-link model is obtained in a time-series manner. Based on the angle thus obtained, the torque at the joint J2 is obtained in a time-series manner. The torque at the joint J2 correlates with the torque applied from the human body h1 to the golf club 8.

Based on the three-dimensional coordinate of each marker, a three-dimensional angle at the joint is determined. Therefore, the angle around any axis can be determined as the angle at the joint. In other words, the angle on any plane can be determined as the angle at the joint. Therefore, the torque around any axis can be determined as the torque at the joint.

One example of the calculation method for determining the angle and torque based on the three-dimensional coordinate will be explained below.

Figure 3:
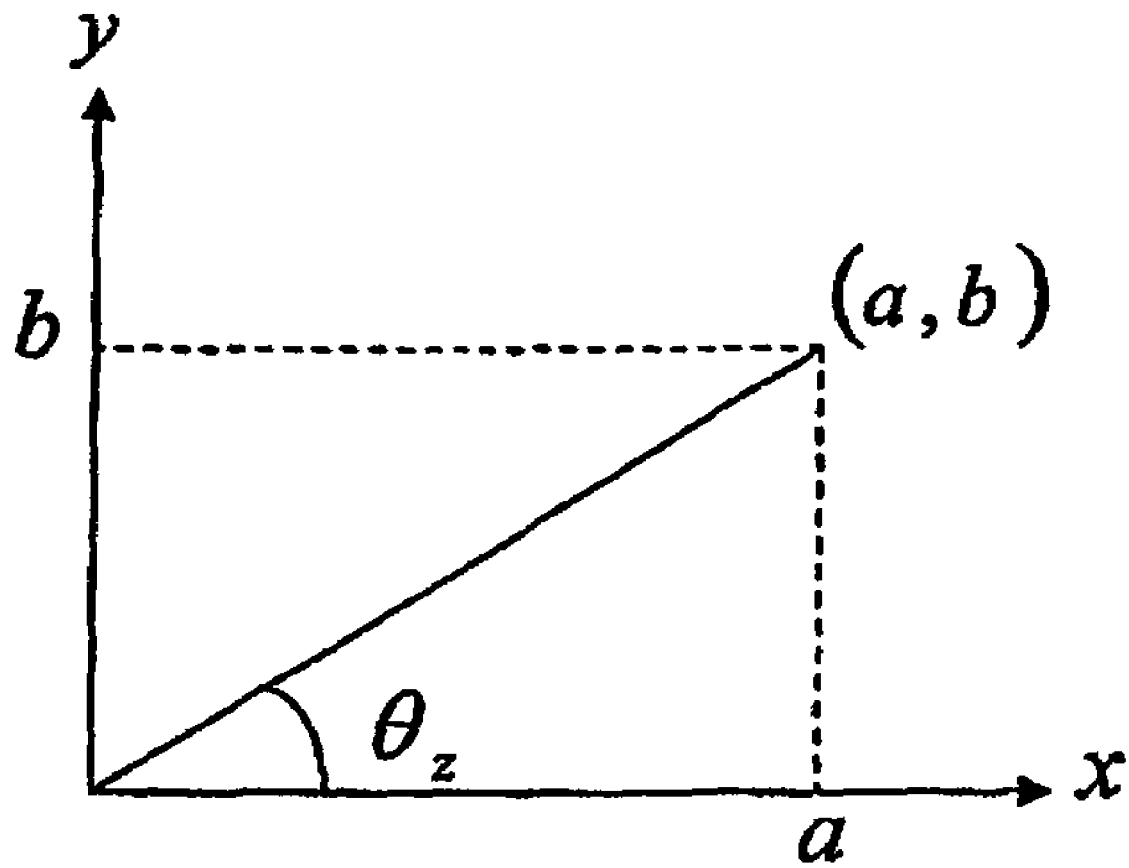
FIG. 3 shows a graphic representation for explaining an example of the calculation method according to the present invention.

Hereinafter, consideration will be made in orthogonal coordinate system composed of x-axis, y-axis and z-axis. For example, angle $\theta z$ around the z-axis is calculated by the following formula (1) provided that the x coordinate is "a", and the y coordinate is "b". This $\theta z$ represents an angle on the x-y plane (see, FIG. 3).

$$\theta z = \tan^{-1}(b/a) \quad (1)$$

Figure 4:
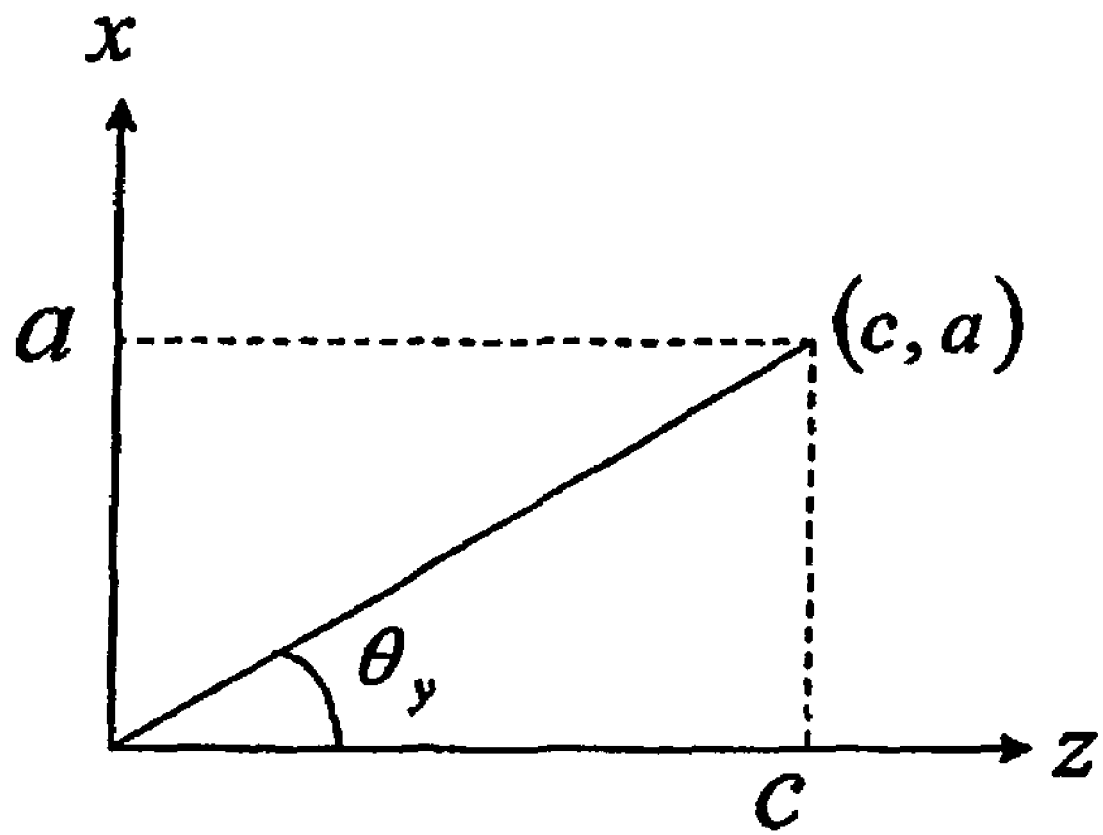
FIG. 4 shows a graphic representation for explaining an example of the calculation method according to the present invention.

Similarly, the angle $\theta y$ around the y-axis is calculated by the following formula (2) provided that the x coordinate is "a", and the z coordinate is "c". This $\theta y$ represents an angle on the z-x plane (see, FIG. 4).

$$\theta y = \tan^{-1}(a/c) \quad (2)$$

Figure 5:
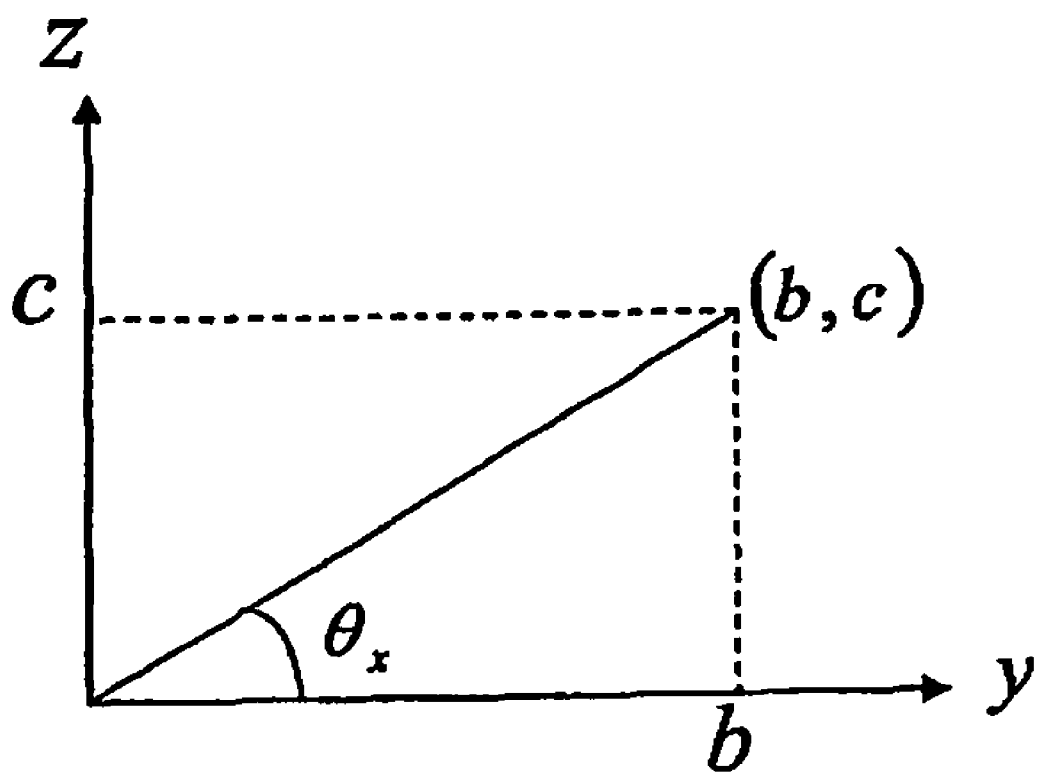
FIG. 5 shows a graphic representation for explaining an example of the calculation method according to the present invention.

Similarly, the angle $\theta x$ around the x-axis is calculated by the following formula (3) provided that the y coordinate is "b", and the z coordinate is "c". This $\theta x$ represents an angle on the y-z plane (see, FIG. 5).

$$\theta x = \tan^{-1}(c/b) \quad (3)$$

Thus, the angle around each axis can be calculated based on the three-dimensional coordinate. The calculation of this angle is well known.

Next, coordinate transformation for transforming a given orthogonal coordinate system into another orthogonal coordinate system will be explained. The content in the following description is well known in the art. In the following description, the vectors in connection with the coordinate axis are all normalized, which are a unit vector with the length of 1. In the following description with respect to the coordinate transformation, the coordinate systems are all orthonormal coordinate system.

Figure 6:
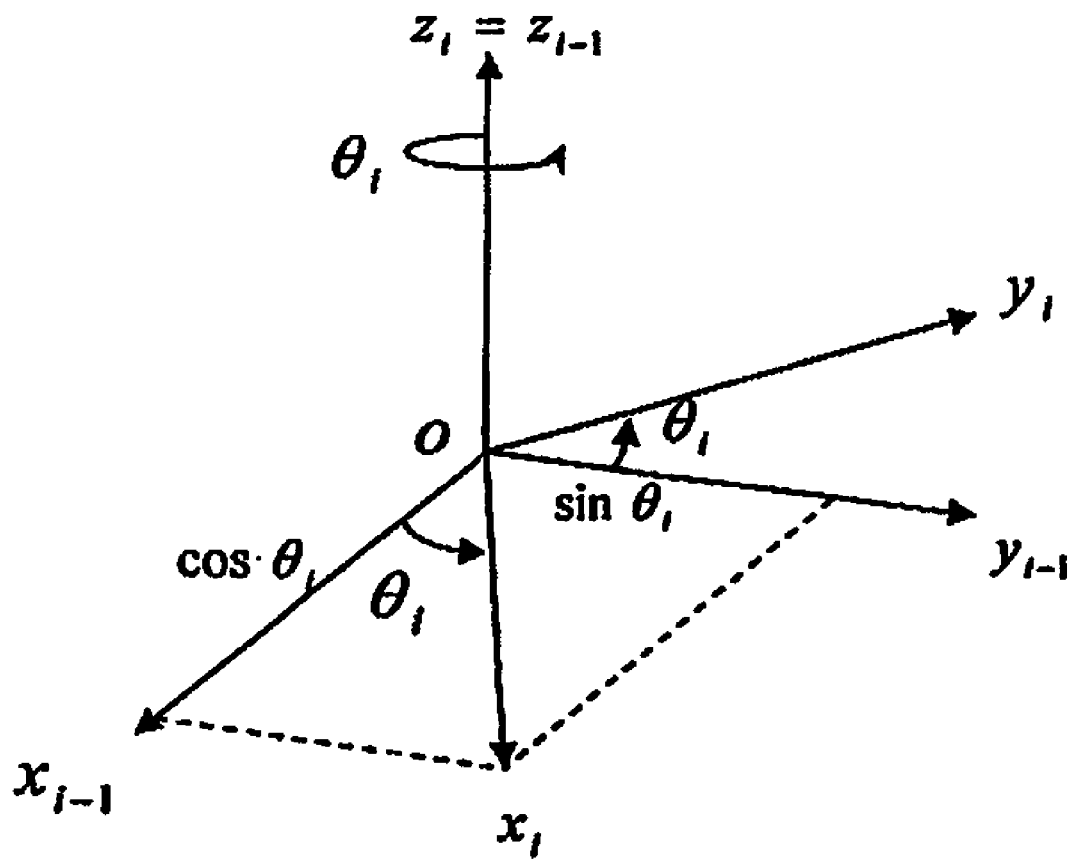
FIG. 6 shows a graphic representation for explaining an example of the calculation method according to the present invention.

As shown in FIG. 6, provided that $\theta_i$ is 0 in a certain orthonormal coordinate system $(x_{i-1}, y_{i-1}, z_{i-1})$, it is assumed that another orthonormal coordinate system $(x_i, y_i, z_i)$ is present in which $(x_i, y_i, z_i) = (x_{i-1}, y_{i-1}, z_{i-1})$. First, a case in which $(x_i, y_i, z_i)$ is rotated around the $z_i$ axis $(=z_{i-1}$ axis) by an angle $\theta_i$ is supposed. Taking into consideration that the length of $x_i$ is 1, as shown in FIG. 6, the $x_{i-1}$ direction component of $x_i$ is $\cos \theta_i$; the $y_{i-1}$ direction component of $x_i$ is $\sin \theta_i$; and the $z_{i-1}$ direction component of $x_i$ is 0. Therefore, the following formula (4) is derived. This formula (4) can be represented with vectors to lead to the following formula (5). The formula (5) represents $x_i$ according as the $(x_{i-1}, y_{i-1}, z_{i-1})$ coordinate system. Similarly, the following formula (6) and formula (7) may be also derived with respect to the unit vector $y_i$ and the unit vector $z_i$. In connection with the formula (5), the formula (6) and the formula (7), $x_i$, $y_i$ and $z_i$ altogether can be represented by the following formula (8). Here, Rot(z, $\theta$) has the meaning represented by the following formula (9). Rot(z, $\theta_i$) is a rotation matrix for deriving the $(x_i, y_i, z_i)$, provided that $\theta_i$ is 0, when $(x_{i-1}, y_{i-1}, z_{i-1})$ is rotated around the $z_i$ axis $(=z_{i-1}$ axis) by an angle $\theta_i$ in two coordinate systems with $(x_i, y_i, z_i) = (x_{i-1}, y_{i-1}, z_{i-1})$.

$$x_i = x_{i-1} \cos\theta_i + y_{i-1} \sin\theta_i + z_{i-1} \cdot 0 \quad (4)$$

$$x_i = (x_{i-1}, y_{i-1}, z_{i-1}) \begin{bmatrix} \cos\theta_i \\ \sin\theta_i \\ 0 \end{bmatrix} \quad (5)$$

$$y_i = (x_{i-1}, y_{i-1}, z_{i-1}) \begin{bmatrix} -\sin\theta_i \\ \cos\theta_i \\ 0 \end{bmatrix} \quad (6)$$

$$z_i = (x_{i-1}, y_{i-1}, z_{i-1}) \begin{bmatrix} 0 \\ 0 \\ 1 \end{bmatrix} \quad (7)$$

$$(x_i, y_i, z_i) = (x_{i-1}, y_{i-1}, z_{i-1}) Rot(z, \theta_i) \quad (8)$$

$$Rot(z, \theta) = \begin{bmatrix} \cos\theta & -\sin\theta & 0 \\ \sin\theta & \cos\theta & 0 \\ 0 & 0 & 1 \end{bmatrix} \quad (9)$$

The coordinate transformation by this rotation matrix can be applied to the link model. The aforementioned $(x_i, y_i, z_i)$ can be assumed to be a coordinate system configured on the (i−1)-th link, and the aforementioned $(x_{i-1}, y_{i-1}, z_{i-1})$ can be assumed to be a coordinate system configured on the i-th link. Then, it can be considered that an actuator (external force) allows the (i−1)-th link to rotate the i-th link around $z_i$ axis by the angle $\theta_i$, whereby the posture of the i-th link was altered.

Figure 7:
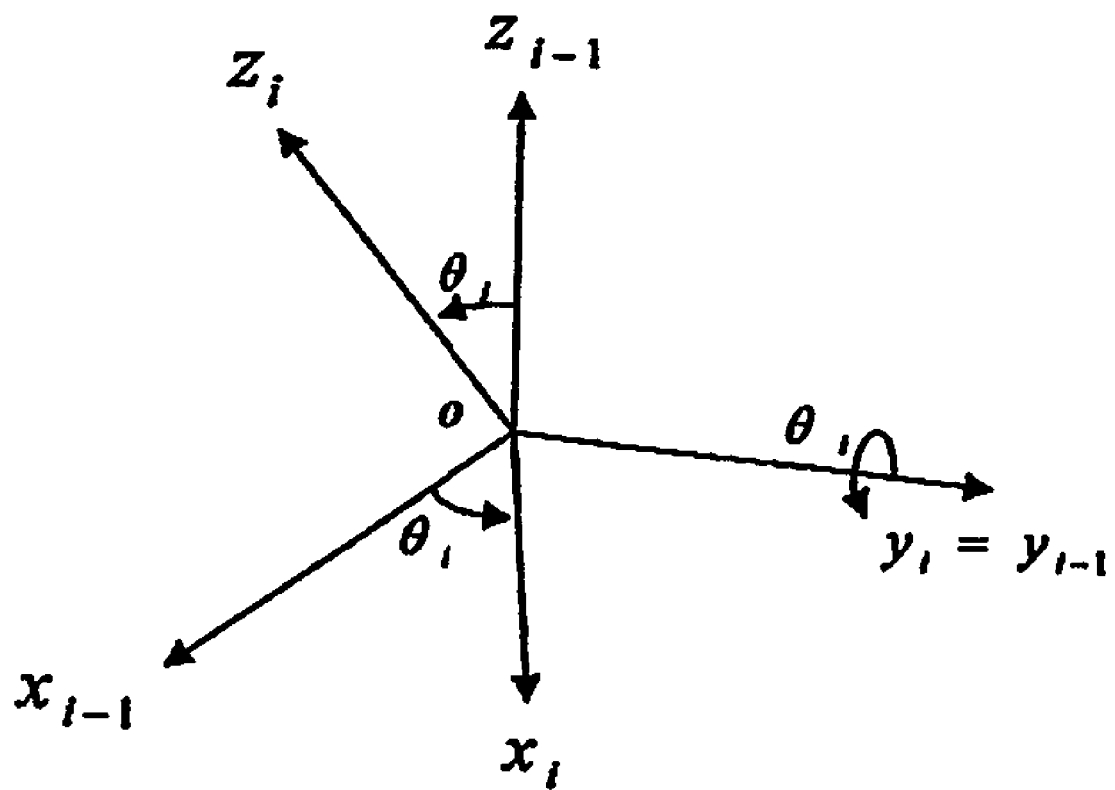
FIG. 7 shows a graphic representation for explaining an example of the calculation method according to the present invention.

Next, as shown in FIG. 7, the case in which $(x_i, y_i, z_i)$ was rotated around the $y_i$ axis $(=y_{i-1}$ axis) by the angle $\theta_i$ is assumed. Presuming similarly to the rotation around the $z_i$ axis described above, the following formula (10) is derived.

Here, Rot (y, θ) has the meaning represented by the following formula (11).

$$(x_i, y_i, z_i) = (x_{i-1}, y_{i-1}, z_{i-1})Rot(y, \theta_i) \quad (10)$$

$$Rot(y, \theta) = \begin{bmatrix} \cos\theta & 0 & \sin\theta \\ 0 & 1 & 0 \\ -\sin\theta & 0 & \cos\theta \end{bmatrix} \quad (11)$$

Figure 8:
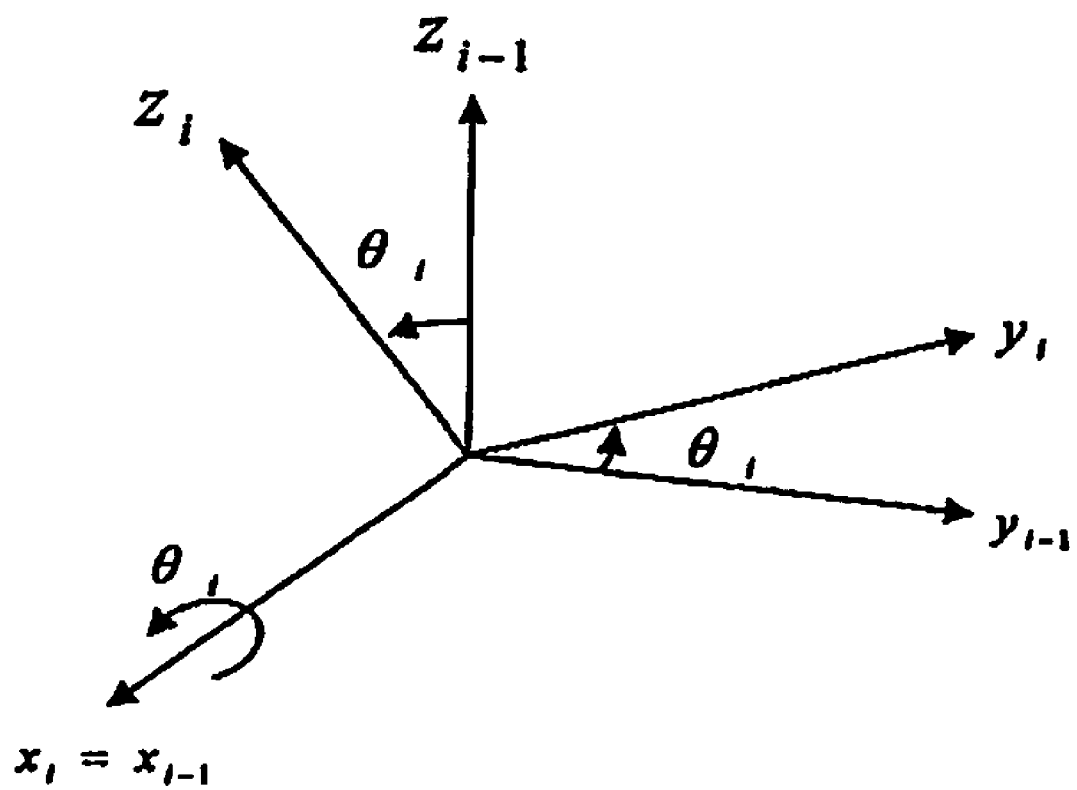
FIG. 8 shows a graphic representation for explaining an example of the calculation method according to the present invention.

Next, as shown in FIG. 8, the case in which $(x_i, y_i, z_i)$ was rotated around the $x_i$ axis ($=x_{i-1}$ axis) by the angle $\theta_i$ is assumed. Presuming similarly to the rotation around the $z_i$ axis described above, the following formula (12) is derived. Here, Rot (x, θ) has the meaning represented by the following formula (13). These coordinate transformation can be represented as in the following formula (14), provided that the rotation matrix is A ($\theta_i$). This formula (14) is also a relational expression derived from the (i−1) coordinate system in view of the i coordinate system.

$$(x_i, y_i, z_i) = (x_{i-1}, y_{i-1}, z_{i-1})Rot(x, \theta_i) \quad (12)$$

$$Rot(x, \theta) = \begin{bmatrix} 1 & 0 & 0 \\ 0 & \cos\theta & -\sin\theta \\ 0 & \sin\theta & \cos\theta \end{bmatrix} \quad (13)$$

$$(x_i, y_i, z_i) = (x_{i-1}, y_{i-1}, z_{i-1})A(\theta_i) \quad (14)$$

For calculation of the torque, a well known Newton Euler method can be used. According to the Newton Euler method, inverse dynamic problems are solved with giving dynamic interpretation through determining the torque required for making such a movement when the angle, the angular velocity and the angular acceleration are provided at the joint of the link model. According to the Newton Euler method, action-reaction, and balance of the moment and the force in connection with each link are considered. Briefly, in the Newton Euler method, acceleration of the center of gravity, the angle, the angular velocity and the angular acceleration at each link, are first determined in a sequential manner from the lowermost to the top link. This calculation is also referred to as normal ascending order calculation. Next, Newton equation of motion and Euler equation of motion are solved, respectively, for each link from the top link to the lowermost link in a sequential manner. This calculation is also referred to as reverse descending calculation since each link is calculated in the reverse order of the aforementioned normal ascending order calculation. Based on these calculation results, the torque that acts on each joint is calculated. The Newton equation of motion is directed to the force on each link, while the Euler equation of motion is directed to the moment on each link. Taking into account the rotation posture at each link, coordinate transformation matrix A is used.

The flow of these calculations will be demonstrated below. First, normal ascending order calculation is performed. In the normal ascending order calculation, the angular velocity, the angular acceleration and the translational acceleration of the center of gravity are calculated on each link. In this normal ascending order calculation, an initial value is first set as in the following formula (15) taking into consideration the influences from the gravitational acceleration. Thereafter, the angular velocity, the angular acceleration and the translational acceleration of the center of gravity are sequentially calculated on each link taking into consideration the rotation posture, based on the following formula (16), formula (17), formula (18) and formula (19). With respect to the order of the calculation, the calculation is performed starting from the lowermost link (i=1 link), then i=2 link, followed by i=3 link, and finally the top link (i=p link).

Next, the reverse descending calculation is performed. In the reverse descending calculation, the torque is calculated using the Newton equation of motion, Euler equation of motion, and the like. In the reverse descending calculation, each link is sequentially subjected to the calculation with the Newton equation of motion represented by the following formula (20) first, and then with the Euler equation of motion represented by the following formula (21). The order of the calculation is reverse of the normal ascending order calculation described above. More specifically, with respect to the order of the calculation, the calculation is performed starting from the top link (i=p link), then i=(p−1) link, followed by i=(p−2) link, and finally the lowermost link (i=1 link).

Furthermore, taking into consideration the balance of the force, and the balance of the moment, the torque that acts on each joint is sequentially calculated by the following formula (22), formula (23) and formula (24). This calculation is also reverse descending calculation. More specifically, with respect to the order of the calculation, the calculation is performed starting from the top link (i=p link), then i=(p−1) link, followed by i=(p−2) link, and finally the lowermost link (i=1 link). One end of the top link, i.e., the end on the side not connected to any other link among the ends of the top link is in a free state without being affected by any force or moment. Therefore, this end of the top is under the initial condition represented by the following formula (25).

$$\omega_0 = 0, \dot{\omega}_0 = 0, \ddot{p}_0 = g \quad (15)$$

$$\omega_i = A_i^T(\omega_{i-1} + A_i q_i \dot{\theta}_i) \quad (16)$$

$$\dot{\omega}_i = A_i^T\{\dot{\omega}_{i-1} + A_i q_i \ddot{\theta}_i + \omega_{i-1} \times (A_i q_i \dot{\theta}_i)\} \quad (17)$$

$$\ddot{p}_i = A_i^T\{\ddot{p}_{i-1} + \dot{\omega}_{i-1} \times \omega_{i-1} \times (\omega_{i-1} \times l_{i-1})\} \quad (18)$$

$$\ddot{p}_{gi} = \ddot{p}_i + \dot{\omega}_i \times a_i + \omega_i \times (\omega_i \times a_i) \quad (19)$$

$$F_i = m_i \ddot{p}_{gi} \quad (20)$$

$$N_i = I_i \dot{\omega}_i + \omega_i \times (I_i \omega_i) \quad (21)$$

$$f_i = A_{i+1} f_{i+1} + m_i \ddot{p}_{gi} \quad (22)$$

$$n_i = A_{i+1} n_{i+1} + I_i \dot{\omega}_i + \omega_i \times (I_i \omega_i) + a_i \times (m_i \ddot{p}_{gi}) + l_i \times A_{i+1} f_{i+1} \quad (23)$$

$$\tau_i = q_i^T n_i \quad (24)$$

$$f_{p+1} = 0, n_{p+1} = 0 \quad (25)$$

Figure 9:
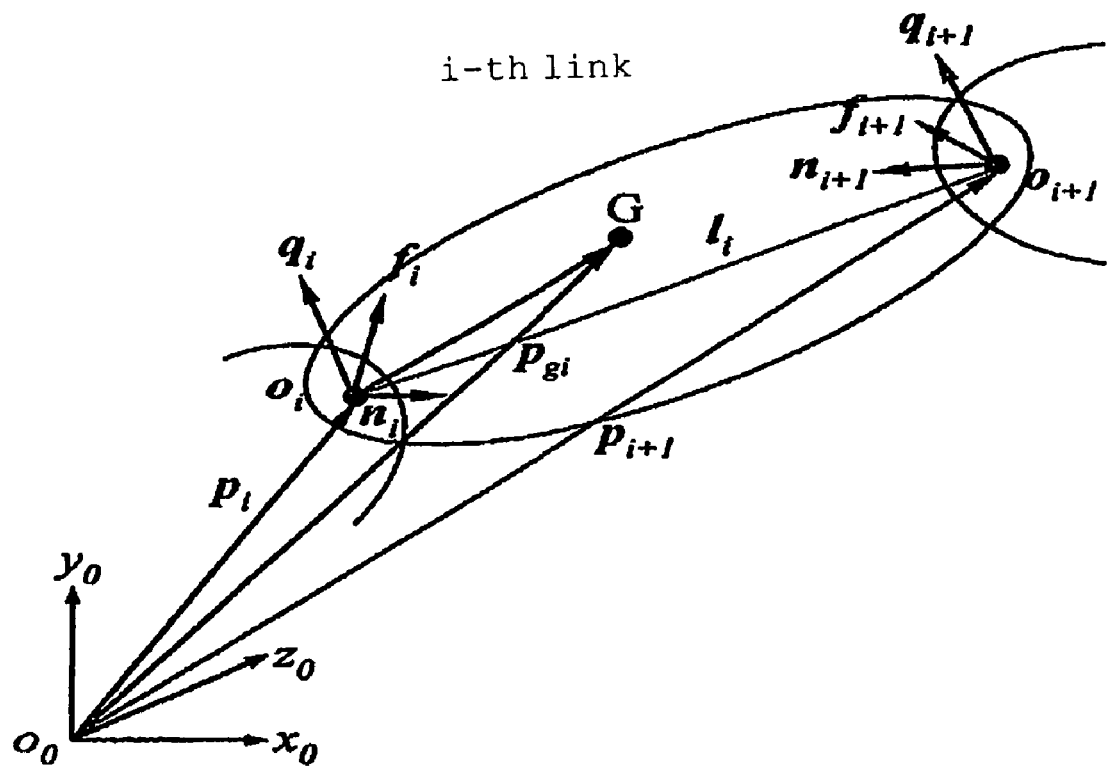
FIG. 9 shows a graphic representation for explaining an example of the calculation method according to the present invention.

$p_i$: vector from origin $o_0$ of $T_0$ origin $o_i$ of $T_i$
$p_{gi}$: vector from origin $o_0$ of $T_0$ center of gravity of the i-th link
$l_i$: vector from origin $o_i$ of $T_i$ to origin $o_{i+1}$ of $T_{i+1}$
$a_i$: vector from origin $o_i$ of $T_i$ to center of gravity of the i-th link
$q_i$: rotation axis of the i-th joint
$\omega_i$: angular vector of the i-th link
$I_i$: inertia matrix at the center of gravity of the i-th link
$f_i$: vector that acts from the i−1-th link to the i-th link
$n_i$: moment vector that acts from the i−1-th link to the i-th link
$A_i$: coordinate transformation matrix from the i-th link to the i+1-th link
$\tau_i$: joint torque of the i-th joint
$\theta_i$: rotation angle of the i-th joint
g: gravitational acceleration vector Using these formula (15) to formula (25), the torque that acts on each link (each joint) is calculated. The vector and the matrix represented by these formula (15) to formula (25) are all described in the coordinate system of the i-th link (the i-th link coordinate system). Therefore, $I_i$, $l_i$ and $a_i$ are constant vectors. Reference drawing of each vector and the like in the formula (15) to formula (25) is shown in FIG. 9.

In the case of the two-link model according to this embodiment, the first link L1 that corresponds to a part of the human body h1 can be regarded as the lowermost link, and thus the second link L2 that corresponds to the golf club 8 can be regarded as the top link. Therefore, according to the normal ascending order calculation, the first link L1 is calculated first, and the second link L2 is then calculated. In contrast, according to the reverse descending calculation, the second link L2 is calculated first, and the first link L1 is then calculated. For example, the procedure as described above can calculate the torque at the joint (joint torque) of the link model.

In this embodiment, pictorial image of the swing of the golf player is first obtained by taking photographs, and the three-dimensional coordinate at multiple points on the pictorial image is analyzed based on this pictorial image of the swing. In this analysis, the DLT method is suitably used. The three-dimensional coordinate data can be obtained in a time-series manner. Based on this three-dimensional coordinate, angle $\theta_{3D}$ formed by straight lines drawn to connect the multiple points on the pictorial image can be calculated. This angle $\theta_{3D}$ is an angle in a three-dimensional space. Thus, based on this angle $\theta_{3D}$, two-dimensional angle on all planes can be determined. In other words, the angle around any axis can be determined based on this angle $\theta_{3D}$. Differentiation of the resulting angle around the given axis in a sequential order, the angular velocity and angular acceleration around the given axis can be calculated. Based on the angular acceleration and force balance, the joint torque around the given axis is obtained. The joint torque refers to the torque at the joint of the link model. The axis for the joint torque can be arbitrarily chosen in accordance with the intended goal and the like of the determination.

In this embodiment, the two-link model shown in FIG. 2A and FIG. 2B is used, and the joint torque at the joint J2 of the two-link model is calculated. For the calculation of this joint torque, the value of the moment of inertia of the golf club 8, and the value of the position of the center of gravity of the golf club 8 are necessary. For the calculation of the joint torque around the given axis, the value of the moment of inertia around this axis, and the value of the position of the center of gravity in this axial direction are necessary.

As described above, any axis can be configured as the axis for the joint torque. An arbitrary axis can be chosen in accordance with the intended goal and the like of the determination. Preferably, multiple axes may be configured. Evaluation of the torque around the multiple axes enables to obtain more detailed torque data. In this respect, more preferably, the torque around three or more distinct axes may be evaluated. Also in light of ease in calculation of the torque, to evaluate the torque around three distinct axes is more preferred. By thus evaluating the torque around three axes, three-dimensional evaluation of the torque is enabled.

The direction of the axis for the torque is not limited. However, in choosing the axis for the torque, it is desired to consider the motion of the golf player and golf club in swinging. Preferable axis for the torque may be an axis that is parallel to the ground and is oriented to the target direction (hereinafter, may be also referred to as A axis). The torque Ta around the A axis (see, FIG. 2B) concerns hand-down or hand-up, generally referred to. The torque Ta around the A axis concerns the torque applied when the head is raised or lowered to the grip. Herein, the target direction means a direction of a straight line drawn to connect the target and the position of the ball in addressing. Other preferable axis for the torque may be an axis in the direction of the shaft axis of the golf club in addressing (hereinafter, may be also referred to as B axis). The torque Tb around the B axis (see, FIG. 2B) concerns the torque applied when the face surface is turned to different orientation. Other preferable axis for the torque may be an axis that is parallel to the ground and is perpendicular to the A axis (hereinafter, may be also referred to as C axis). The torque Tc around the C axis (see, FIG. 2A) is a torque applied in the direction of the swing. In other words, the torque Tc around the C axis concerns a torque for accelerating or reducing the head speed.

Figure 10:
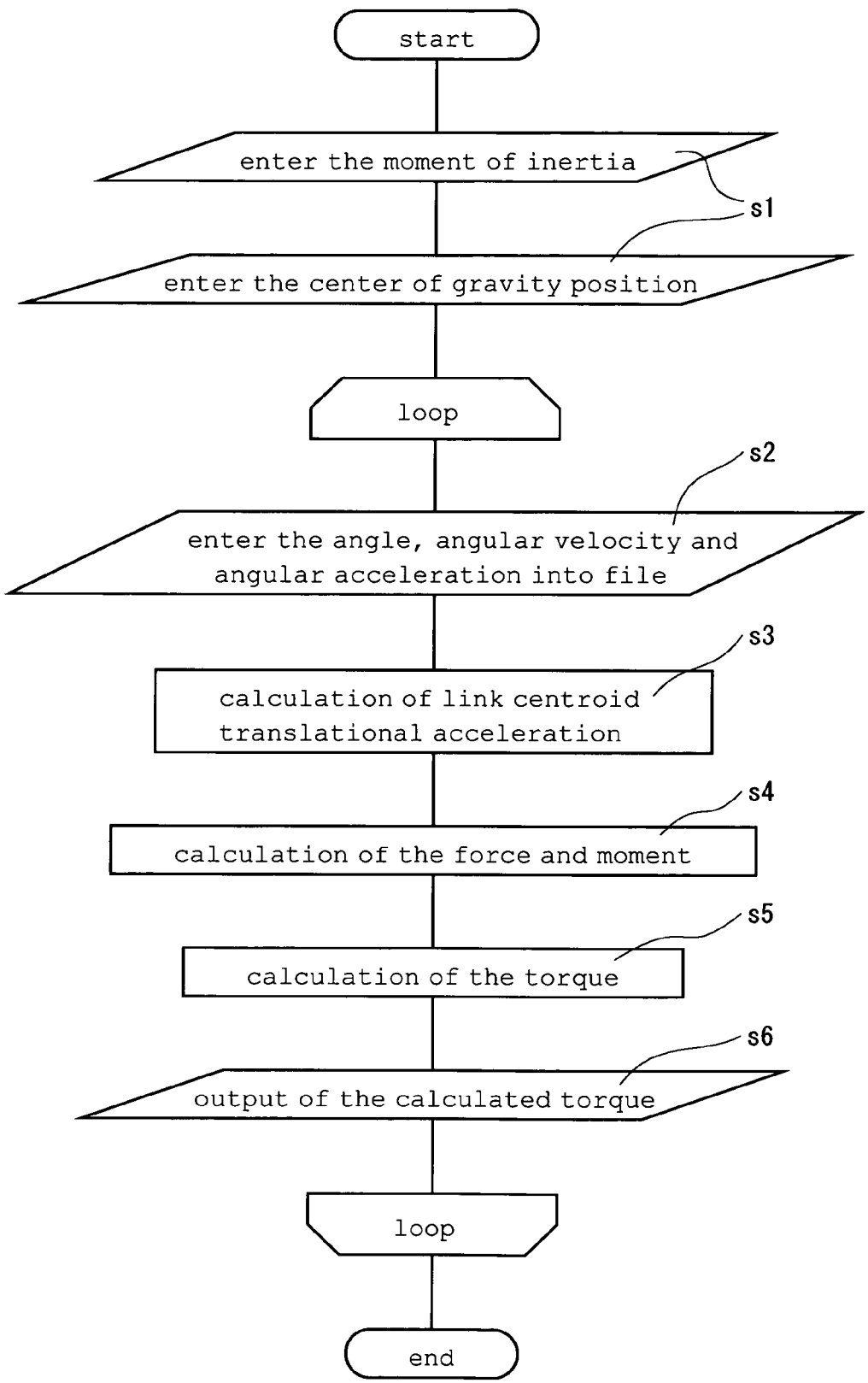
FIG. 10 shows an example of the flow chart illustrating calculation process of the torque.

A flow chart illustrating an outline of a program for determining the joint torque is shown in FIG. 10. This program is recorded in a storage unit of the link model analysis system. In this program, the moment of inertia and the position of the center of gravity of the golf club 8 are entered first (step s1). The entry is conducted with the input unit of the link model analysis system. Next, file entry of the angle, angular velocity and angular acceleration calculated based on the analyses of the three-dimensional coordinate is conducted (step s2). Thereafter, the translational acceleration of the link center of gravity is calculated (step s3). Subsequently, the force and moment imposed to the link is calculated (step s4). Next, the joint torque is calculated (step s5). These calculations are executed by the arithmetic logical unit of the link model analysis system. Then, the calculated joint torque is output (step s6). This outputting is executed by the output unit of the link model analysis system. The procedure from the step s2 to step s6 is repeated until the calculations of all the links are completed. The Newton Euler method is applied to the procedure from step s2 to the step s6. The normal ascending order calculation is conducted in the step s2 and the step s3, while the reverse descending calculation is conducted in the step s4 and the step s5.

In this embodiment, the torque at the connecting position of the human body h1 and the golf club 8 is analyzed using the link model. In this embodiment, the connecting position of the human body h1 and the golf club 8 is the joint J2. In this embodiment, calculation of the joint torque at the joint J2 in a time-series manner allows for the analysis of the torque that acts on the golf club during the swing in a time-series manner.

This joint torque correlates to the torque applied by the human body h1 to the golf club 8. Conventionally, in dynamic behavioral analysis of a golf club, the state of the golf club at each time point has been merely determined. To the contrary, the torque applied by the human body h1 to the golf club 8 is analyzed according to the present invention. Such analyses of the torque enable a great deal of information to be obtained which could not be drawn from conventional analyses.

Hereinafter, the torque applied by the human body h1 to the golf club 8 is also referred to as applied torque. The applied torque can vary depending on a variety of factors. For example, the applied torque can vary depending on specifications of the golf club 8. Also, the torque applied by the human body h1 to the golf club 8 can vary depending on the human body h1. For example, different torque would be applied by professional golf players and average golf players. Moreover, even though the identical golf player swings taking aim at the same target with the identical golf club 8, the applied torque can vary for each swing since the swing by a golf player can be accompanied by variation. The variation of the applied torque can also result in variation of the joint torque of the link model.

The data (torque data) of the applied torque or joint torque are invaluable data which can realize objective digitalization of the correlation of the golf player and the golf club 8. The torque data can provide a great deal of the information which could not have been obtained by prior arts.

The torque data can be employed in a variety of applications. By comparing multiple torque data, a variety of information can be obtained.

The torque data can be applied to, for example, methods of analyzing a golf club, methods of diagnosing a swing, methods of selecting a golf club, methods of designing a golf club, and the like. When there is a difference among multiple torque data, the difference would result from the swing, from the golf club, or from both the swing and the golf club. Based on the difference among the multiple torque data, the golf club during the swing can be analyzed. Based on the difference among the multiple torque data, the swing can be diagnosed. Based on the difference among the multiple torque data, compatibility (congeniality) of a golf player and a golf club can be decided. This compatibility can be applied to a selection method of a golf club. A golf club that is compatible with a type of a golf player, the golf club is compatible such type of golf players. To comprehend preferable golf clubs helps in developing golf clubs. Such comprehension of preferable golf clubs can be applied to methods for designing a golf club.

In the method of analyzing a golf club according to the present invention, the torque that acts on the golf club during the swing is analyzed in a time-series manner. One example of this method of analyzing a golf club includes modeling of the golf club, and at least a part of the golf player who grips a grip member of this golf club to provide a link model in which the golf club is connected with the golf player via a joint, the torque that acts on this joint during the swing is analyzed in a time-series manner. This joint connects a link that corresponds to at least a part of the human body h1, with a link that corresponds to at least a part of the golf club. Therefore, this joint corresponds to a connection point of the human body h1 and the golf club 8. Use of the link model enables the torque that acts on a golf club to be readily calculated with good accuracy. The joint torque calculated by the link model is an approximate value of actually applied torque. Therefore, the applied torque is not completely consistent with the joint torque of the link model. However, it is clear that the applied torque can correlate with the joint torque.

In the method of diagnosing a swing according to the present invention, a result of hitting when the golf player hits taking aim at a target is compared with a result of a time-series analysis of the torque that acts on the golf club during the swing of this hitting. When the result of hitting achieved through hitting taking aim at a target is favorable, the swing in the hitting can be decided as being favorable. When the result of hitting achieved through hitting taking aim at a target is unfavorable, the swing in the hitting is decided as being unfavorable. Whether or not the result of hitting is favorable can be decided by, for example, the distance between the target and the finally attained point of hitting (the finally attained point of a hit ball). Also, when the swing of putting is decided, in particular, the result of hitting may be decided whether or not sinking in was successful. Other standard for evaluating the result of hitting may involve flight distance, directionality of the hit ball, back spin rate, side spin rate, launch angle, initial speed at launch, and the like.

In other method of diagnosing a swing according to the present invention, a predetermined optimum torque curve is compared with an observed torque curve obtained by a time-series analysis of a torque that acts on a golf club during the swing. Graphic representation of multiple data obtained in a time-series manner along the time axis allows a data set situated along a curve to be obtained. This data set is also referred to as torque curve. By comparing the torque curves one another, the difference of the torque values at least one time points during the swing can be revealed. The difference of the torque values can lead to diagnosis of the swing. With the observed torque curve more approximate to the optimum torque curve, the swing according to this observed torque curve can be decided as being favorable.

The optimum torque curve can be a standard in diagnosis of the swing and the like. Predetermination of the optimum torque curve can be performed from a variety of view points. For example, when the swing of golf player A is diagnosed, a torque curve provided by golf player B who is a better player of golf than the golf player A could be the optimum torque curve. For example, the golf player A may be an average golf player; and the golf player B may be a professional golf player. In this case, preferably, determination of the optimum torque curve is performed under the same conditions with the determination of the observed torque curve except for the different golf players. In other words, it is desired that the determination of the optimum torque curve and the determination of the observed torque curve be performed under conditions of an identical golf club, identical hitting point, and identical target. The optimum torque curve may be also obtained by deriving an average of multiple torque curves provided by the golf player B.

In addition, when the identical golf player A hits multiple times, the torque curve obtained when a more favorable result of hitting is achieved may be employed as the optimum torque curve. In this case, preferably, determination of the optimum torque curve is performed under the same conditions with the determination of the observed torque curve. In other words, it is desired that the determination of the optimum torque curve and the determination of the observed torque curve be performed by the identical golf player A under conditions of an identical golf club, identical hitting point, and identical target. This optimum torque curve may be applied to diagnosis of the swing by the golf player A, or may be applied to diagnosis of other golf player other than the golf player A. The optimum torque curve may also be obtained by deriving an average of multiple torque curves with favorable result of hitting proven.

In addition, the optimum torque curve may be predetermined based on the preference of the golf player. For example, the torque curve obtained by hitting with a golf club preferred by single or multiple golf players may be employed as the optimum torque curve. For example, the torque curve obtained in hitting with a golf club that is excellent in feeling upon hitting may be the optimum torque curve. The torque curve of a golf club highly ranked in sensuous evaluation by single or multiple golf players may be also employed as the optimum torque curve. This sensuous evaluation may involve ease in swinging and setting, and feel at impact and the like.

A method of diagnosing a swing in which the optimum torque curve is not used is also available. For example, the method of diagnosing a swing in which multiple torque curves provided by an identical golf player are compared with one another is also available. When the multiple torque curves do not vary widely, it can be diagnosed that high stability of the swing is suggested.

The method of selecting a golf club according to the present invention includes steps of: hitting multiple golf clubs to obtain results of time-series analyses of the torque that acts on the each golf club during the swing, there by deriving a torque curve for each golf club based on these analysis results; and comparing a predetermined optimum torque curve with the torque curves for each club, respectively to select an optimum golf club from among the multiple golf clubs.

The optimum torque curve is employed as a standard in selecting the golf club. Predetermination of the optimum torque curve can be performed from a variety of view points as described above. The torque curve for each club may be an observed torque curve obtained by swinging a given golf club, or may be an observed torque curve obtained by deriving an average of multiple observed torque curve. In addition, a torque curve with favorable result of hitting proven may be chosen from among multiple observed torque curves as the torque curve for each club.

This method of selecting a golf club is useful when, for example, a golf player selects an optimum golf club from among multiple golf clubs. For example, a case in which golf player A selects an optimum golf club from among multiple golf clubs is supposed. In this case, selection of an optimum golf club from among three types of golf clubs (golf club L1, golf club L2 and golf club L3) is supposed. First, a golf player (golf player A) who wants to select a golf club hits each of multiple types of golf clubs, and derives a torque curve for each club. The torque curve obtained through hitting with the golf club L1 by this golf player A is torque curve for each club L1. The torque curve obtained through hitting with the golf club L2 by this golf player A is torque curve for each club L2. The torque curve obtained through hitting with the golf club L3 by this golf player A is torque curve for each club L3. Next, the optimum torque curve is compared with each torque curve for each club. Subsequently, the torque curve for each club that is most approximate to the optimum torque curve is chosen from among respective torque curves for each club. More specifically, the torque curve for each club that is most approximate to the optimum torque curve is chosen from among the torque curve for each club L1, the torque curve for each club L2 and the torque curve for each club L3. Then, the golf club according to the torque curve for each club that is most approximate to the optimum torque curve is chosen as the optimum golf club. For example, when the torque curve for each club L3 is most approximate to the optimum torque curve, the golf club L3 is selected as the optimum golf club for the golf player A. The optimum torque curve in selecting a golf club may be either the torque curve provided by the golf player who wants to select a golf club, or the torque curve provided by other golf player.

A method of selecting a golf club in which any optimum torque curve is not used is also available. For example, a method of selecting a golf club in which multiple torque curves provided by an identical golf player are compared with one another, and this comparison is made on multiple golf clubs, respectively, is also available. When the multiple torque curves do not vary widely, the golf club is evaluated as being highly stable in the swing. According to this selection method, a golf club that is likely to achieve stable swing can be selected.

The method of designing a golf club of the present invention includes: a step of hitting of multiple golf clubs by multiple golf players, respectively, to analyze results of time-series analyses of the torque that acts on each golf club during the swing in the hitting, thereby obtaining multiple observed torque curves based on the analysis results; a step of evaluating the observed torque curve using at least one of the multiple observed torque curves (evaluation step); and a step of designing the golf club based on the evaluation result.

In designing a golf club, for example, multiple products or multiple trial models are evaluated. Highly evaluated golf clubs can be an index in designing. It is rational to design so as to provide a highly evaluated golf club.

According to the method of designing a golf club, each of the multiple golf players hit the multiple golf clubs, respectively, whereby multiple observed torque curves are derived. Then, thus resulting observed torque curves are evaluated. For example, designing may be executed on the basis of golf clubs that derives an observed torque curve which was highly evaluated.

In specific examples of the method of designing a golf club, e.g., average torque curve for each club is obtained in the evaluation step. The average torque curve for each club is the torque curve determined through deriving an average of multiple observed torque curves obtained by hitting with an identical golf club by multiple golf players. Furthermore, in the above evaluation step, this average torque curve for each club is compared with an optimum torque curve. The average torque curve for each club that is more approximate to the optimum torque curve is more highly evaluated. According to this method of designing a golf club, evaluation accuracy can be enhanced because the swings by multiple golf players are reflected. Additionally, in the method of designing a golf club, the multiple golf clubs are preferably multiple trial golf clubs. In this case, the most highly evaluated trial golf club can be selected from among the multiple trial golf clubs. Therefore, designing is enabled on the basis of this highly evaluated trial golf club.

The degree of approximation of other torque curve to the optimum torque curve can be evaluated from a variety of aspects. The other torque curve may be the aforementioned observed torque curve, and the like, and the observed torque curve may involve the aforementioned torque curve for each club and average torque curve for each club. The degree of approximation can be evaluated by, for example, a maximum of difference of the torque values. This degree of approximation can be evaluated by, for example, the difference of averages of the torque values at all time points of the swing. This degree of approximation can be evaluated by, for example, the difference of the torque values at a particular time point. This degree of approximation can be evaluated by, for example, similarity of the shape of the torque curve. This degree of approximation can be evaluated by, for example, the presence or absence of a particular peak. This degree of approximation can be evaluated by, for example, the torque value at a particular peak on the torque curve. This degree of approximation can be evaluated by, for example, the time point of a particular peak on the torque curve. This degree of approximation can be evaluated by, for example, the time point of a particular inflexion point on the torque curve. This degree of approximation can be evaluated by, for example, the torque value of a particular inflexion point on the torque curve. When torque values are different at least one time point, the difference in the torque curve can be revealed.

In evaluation of the multiple torque curves or multiple torque data, conformity of the time point during the swing may be considered. For the purpose of making conformity of the time points, a particular state during the swing is predetermined as a reference time point. For example, the time point at the top of the swing can be the reference time point. Also, initiation time point of the swing can be the reference time point. Alternatively, the time point at impact can be the reference time point. Such a reference time point can be preset as, for example, the time point of 0 (zero).

The torque curve may be obtained based on the torque around a given axis. The torque curve is obtained on every axis. When multiple axes are predetermined, multiple torque curves can be obtained for respective axes. When the multiple torque data are compared, the torque data with respect to an identical axis are compared.

The golf club according to the present invention is not limited, and any golf club can be used. A putter club is preferred as the golf club because of facility in determination since the swing width is comparatively small. In the case in which the golf club is a putter club, less error between the link model and actual human body motion is attained due to the comparatively small swing width. When the golf club is a putter club, modeling can be readily executed with the link model having small number of the links because the change in the angle at each joint of the human body during the swing is small.

EXAMPLES

Hereinafter, effects of the present invention will be clarified by way of Examples, however, the Examples should not be construed as a limitation on the present invention.

According to the embodiment shown in FIG. 1, determination of a swing was carried out. A putter club was used as the golf club. Two types of putter clubs including putter club α and putter club β were used as the putter club. Senior class players, middle class players and junior class players enrolled as testers. The test was conducted by putting, taking aim at an eyemark 5 m far away. This eyemark had the size and shape that are substantially the same as those of the cup.

Before taking photographs of the swing, photographs of points having a known three-dimensional coordinate referred to as a control point were taken together with the human body h1. Next, the photographs of the swing were taken with two high speed cameras. Synchronization of the two cameras was permitted, and the condition was set to take 60 (frame/second). FASTCAM 1280PCI manufactured by PHOTRON Ltd., was used as the high speed camera. Based on the pictorial image obtained by taking the photographs of the swing, three-dimensional coordinates at three points on the pictorial image were analyzed using the DLT method. Data of the three-dimensional coordinate at three points (marker m1, marker m2 and marker m3) on the pictorial image were obtained in a time-series manner by this analysis. As a software for performing the analysis by this DLT method, DIPP-Motion XD manufactured by DITECT Co. Ltd., was used. The angle formed with the first link L1 and the second link L2 was determined based on this three-dimensional coordinate. From this angle, the angles around the A axis, around the B axis, and around the C axis at the joint J2 were determined. Furthermore, differentiation of these angles derived angular velocity and angular acceleration around each axis. Torque data around each axis at the joint J2 in a time-series manner were obtained according to the Newton Euler method based on these results. These time-series torque data were plotted on a coordinate plane with the ordinate being the torque (N·m), and the abscissa being the time (second), whereby the torque curve was obtained. The abscissa (time axis) of the torque curve was set to give the time point at the top of the swing of 0 second. Definition of the A axis, the B axis and the C axis is as described above.

Specifications of the putter club α and the putter club β were as follows.

[putter club α]
club length (mm): 864.0
total weight (g) of club: 562.0
moment of inertia (kg·m$^2$) around the A axis: 0.048706
moment of inertia (kg·m$^2$) around the B axis: 0.0005942
moment of inertia (kg·m$^2$) around the C axis: 0.051352
centroidal distance A (mm): 27.3
centroidal distance B (mm): 617.5
centroidal distance C (mm): 226.5

[putter club β]
club length (mm): 863.6
total weight of club (g): 539.2
moment of inertia (kg·m$^2$) around the A axis: 0.052234
moment of inertia (kg·m$^2$) around the B axis: 0.0004532
moment of inertia (kg·m$^2$) around the C axis: 0.052528
centroidal distance A (mm): 9.1
centroidal distance B (mm): 625.1
centroidal distance C (mm): 200.6

The centroidal distance A refers to an A axial distance from the grip end to the center of gravity of the club; the centroidal distance B refers to a B axial distance from the grip end to the center of gravity of the club; and the centroidal distance C refers to a C axial distance from the grip end to the center of gravity of the club.

Example 1

FIG. 11A, FIG. 11B and FIG. 11C shows graphs illustrating the torque curve in hitting with the putter club a by senior class player A. FIG. 11A, FIG. 11B and FIG. 11C shows torque curves obtained by swing two times, with one torque curve illustrated by a solid line, and another torque curve illustrated by a dashed line. In the area where no dashed line is found, the solid line overlaps with the dashed line. FIG. 11A shows the torque curve of the torque Ta around the A axis; FIG. 11B shows the torque curve of the torque Tb around the B axis; and FIG. 11C shows the torque curve of the torque Tc around the C axis. Both hitting for the solid line and the dashed line achieved a good shot. FIG. 11A, FIG. 11B and FIG. 11C shows high similarity of the torque curve illustrated by the dashed line to the torque curve illustrated by the solid line. This high similarity suggests stability of the swing achieved by the senior class player. Furthermore, this high similarity suggests a correlation of the torque curve with the result of hitting. Herein, good shot means that the result of hitting was favorable, while bad shot means that the result of hitting was unfavorable.

Example 2

FIG. 12A, FIG. 12B and FIG. 12C shows graphs illustrating the torque curve in hitting with the putter club a by a junior class player. FIG. 12A, FIG. 12B and FIG. 12C shows torque curves obtained by swing two times, with one torque curve illustrated by a solid line, and another torque curve illustrated by a dashed line. In the area where no dashed line is found, the solid line overlaps with the dashed line. The solid line shows the torque curve with a good shot, while the dashed line shows the torque curve with a bad shot. FIG. 12A shows the torque curve of the torque Ta around the A axis; FIG. 12B shows the torque curve of the torque Tb around the B axis; and FIG. 12C shows the torque curve of the torque Tc around the C axis. In FIG. 12B, symmetry of the torque curve with respect to the line at a time point of 0 second is more superior at the good shot (solid line), and is more inferior at the bad shot (dashed line). Similar tendency of this difference in the symmetry is also found in FIG. 12C.

FIG. 12A, FIG. 12B and FIG. 12C shows low similarity of the torque curve illustrated by the dashed line to the torque curve illustrated by the solid line. This low similarity suggests instability of the swing achieved by the junior class player. Furthermore, this low similarity suggests a correlation of the torque curve with the result of hitting. In FIG. 12A, a characteristic peak is found immediately after the initiation of the swing back (around −0.5 second). This peak is not found on the torque curve provided by the senior player show in FIG. 11A.

Example 3

FIG. 13A, FIG. 13B and FIG. 13C shows graphs illustrating the torque curve in hitting with the putter club a by the senior class player A. FIG. 13A, FIG. 13B and FIG. 13C shows torque curves obtained by swing two times, with one torque curve illustrated by a solid line, and another torque curve illustrated by a dashed line. The solid line shows the torque curve with a good shot, while the dashed line shows the torque curve with a bad shot. In the area where no dashed line is found, the solid line overlaps with the dashed line. FIG. 13A shows the torque curve of the torque Ta around the A axis; FIG. 13B shows the torque curve of the torque Tb around the B axis; and FIG. 13C shows the torque curve of the torque Tc around the C axis. With respect to the torque around the A axis, a peak is found immediately after the swing back (around −0.6 second) for the bad shot (dashed line). This peak is not present for the good shot (solid line). In addition, symmetries with respect to the line at a time point of 0 second for the good shot and for the bad shot are different in the torque curve around the B axis and the torque around the C axis curve.

Example 4

Figure 14A:
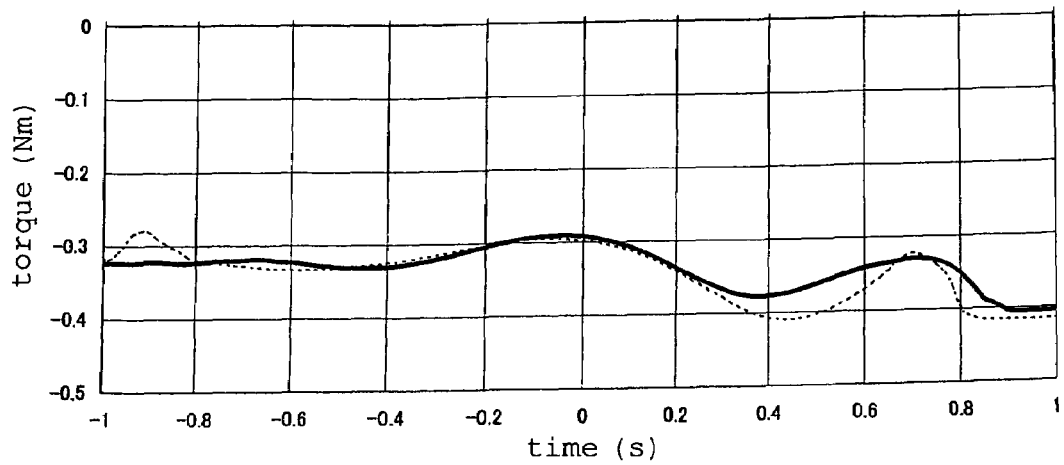
FIG. 14A, FIG. 14B and FIG. 14C shows graphs illustrating the torque curve of Example 4.
Figure 14B:
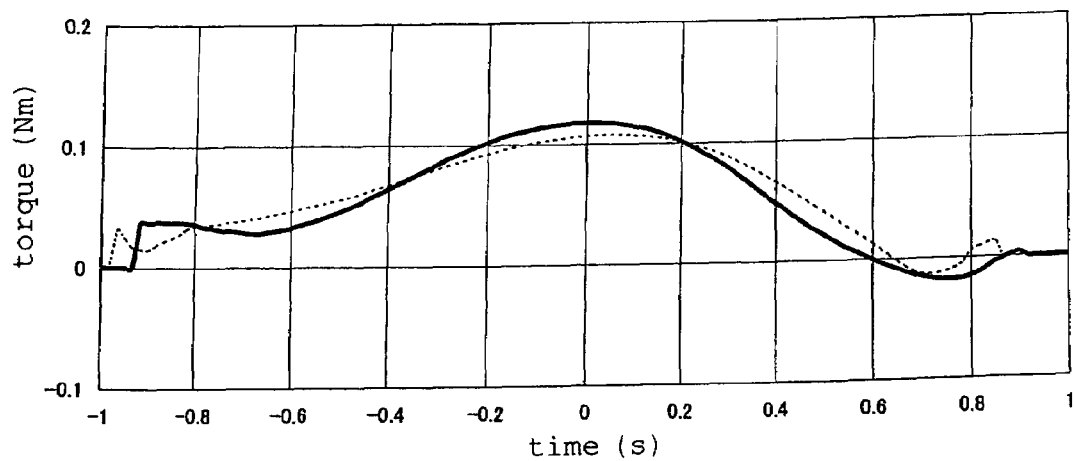
Figure 14C:
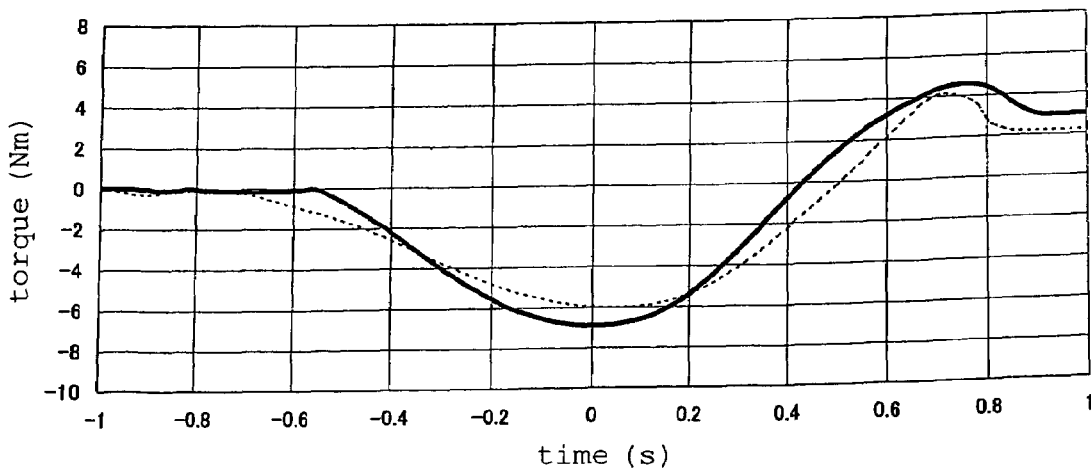

FIG. 14A, FIG. 14B and FIG. 14C shows graphs illustrating the torque curve in hitting with the putter club a by senior class player B. FIG. 14A, FIG. 14B and FIG. 14C shows torque curves obtained by swing two times, with one torque curve illustrated by a solid line, and another torque curve illustrated by a dashed line. The solid line shows the torque curve with a good shot, while the dashed line shows the torque curve with a bad shot. In the area where no dashed line is found, the solid line overlaps with the dashed line. FIG. 14A shows the torque curve of the torque Ta around the A axis; FIG. 14B shows the torque curve of the torque Tb around the B axis; and FIG. 14C shows the torque curve of the torque Tc around the C axis. Symmetries with respect to the line at a time point of second for the good shot and for the bad shot are different in the torque curve around the B axis and the torque around the C axis curve. This symmetry is more superior for the good shot.

Example 5

Figure 15A:
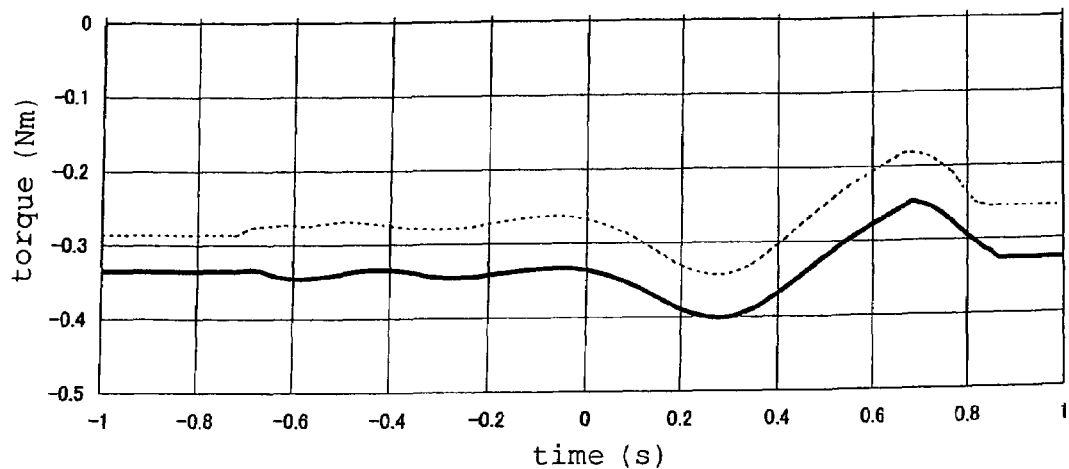
FIG. 15A, FIG. 15B and FIG. 15C shows graphs illustrating the torque curve of Example 5; and FIG. 16A, FIG. 16B
Figure 15B:
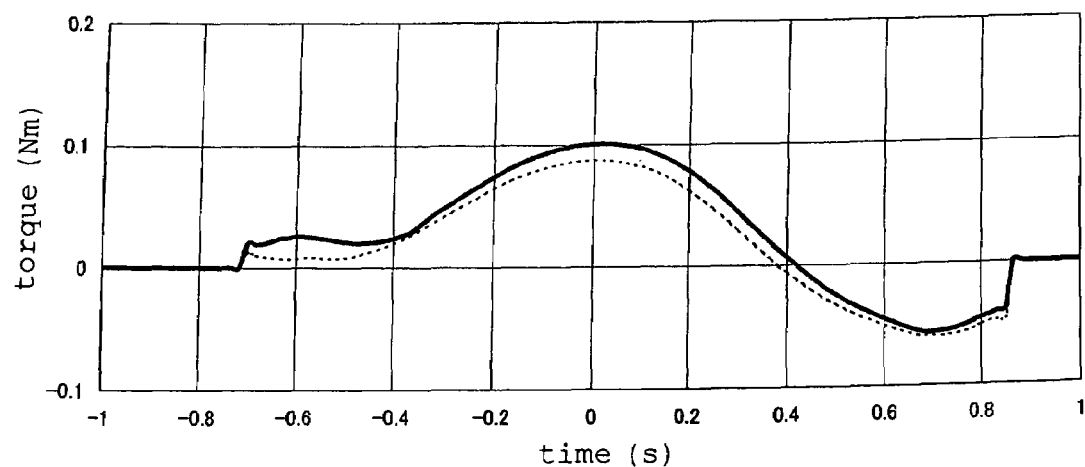
Figure 15C:
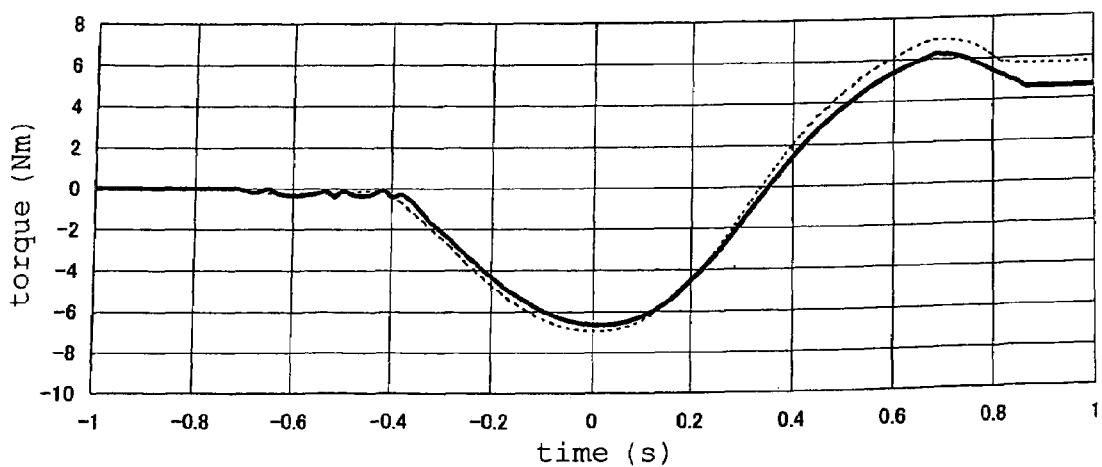

FIG. 15A, FIG. 15B and FIG. 15C shows graphs illustrating the torque curve in hitting with the putter club a and the and putter club β by the senior class player A. FIG. 15A, FIG. 15B and FIG. 15C shows torque curves obtained by swing two times, with one torque curve illustrated by a solid line, and another torque curve illustrated by a dashed line. The solid line shows the torque curve with a good shot by the putter club α, while the dashed line shows the torque curve with a good shot by the putter club β. In the area where no dashed line is found, the solid line overlaps with the dashed line. FIG. 15A shows the torque curve of the torque Ta around the A axis; FIG. 15B shows the torque curve of the torque Tb around the B axis; and FIG. 15C shows the torque curve of the torque Tc around the C axis.

With respect to the torque around the A axis, the torque depicted by the dashed line is greater than the torque depicted by the solid line at all the time points. With respect to the torque around the B axis, the torque depicted by the dashed line is smaller than the torque depicted by the solid line. These result from the difference in the putter club α and the putter club β. Symmetries with respect to the line at a time point of 0 second in the torque curve around the B axis are different. This symmetry is more superior in the dashed line (putter club β). In the sensuous evaluation, the senior class player A evaluated that the putter club β is better in swing than the putter club α.

Example 6

FIG. 16A, FIG. 16B and FIG. 16C shows graphs illustrating the torque curve in hitting with the putter club α and the and putter club β by a middle class player. FIG. 16A, FIG. 16B and FIG. 16C shows torque curves obtained by swing two times, with one torque curve illustrated by a solid line, and another torque curve illustrated by a dashed line. The solid line shows the torque curve with a good shot by the putter club α, while the dashed line shows the torque curve with a good shot by the putter club β. In the area where no dashed line is found, the solid line overlaps with the dashed line. FIG. 16A shows the torque curve of the torque Ta around the A axis; FIG. 16B shows the torque curve of the torque Tb around the B axis; and FIG. 16C shows the torque curve of the torque Tc around the C axis.

With respect to the torque around the A axis, the torque depicted by the dashed line is greater than the torque depicted by the solid line at all the time points. This tendency is similar to that in the torque curve shown in FIG. 15A. Further, symmetry with respect to the line at a time point of 0 second in the torque curve around the B axis is more superior in the solid line (putter club a). Also, symmetry with respect to the line at a time point of 0 second in the torque curve around the C axis is more superior in the solid line (putter club a). In the sensuous evaluation, this middle class player evaluated that the putter club α is better in swing than the putter club β.

Meanings of the plus and minus in the above observed torque data are now explained. The torque around the A axis being positive can mean that the torque in a direction to allow the golf club to rotate downward with the grip end as a center is applied around the A axis. The torque around the A axis being negative can mean that the torque in a direction to allow the golf club to rotate upward with the grip end as a center is applied around the A axis. The torque around the B axis being positive can mean that the torque in a direction to allow the golf club to rotate such that the face is closed with the shaft axis as a center is applied around the B axis. The torque around the B axis being negative can mean that the torque in a direction to allow the golf club to rotate such that the face is opened with the shaft axis as a center is applied around the B axis. The torque around the C axis being positive can mean that the torque in a direction to allow the golf club to rotate ahead toward the target direction (traveling direction of the downward swing and follow through swing) with the grip end as a center is applied around the C axis. The torque around the C axis being negative can mean that the torque in a direction to allow the golf club to rotate backwards in the target direction (traveling direction of the back swing) with the grip end as a center is applied around the C axis.

In all the Examples described above, the torque Ta around the A axis is always negative. These indicate the consequence that the torque for maintaining the angle θa around the A axis shown in FIG. 2B acted. In calculation of the torque, the gravity that acts on the golf club 8 is considered. Resulting from this gravity, the golf club 8 is apt to hang vertically. Therefore, this gravity causes a torque in a direction to increase the angle θa. However, contrary to the torque resulting from this gravity, the angle θa is almost kept constant. The torque Ta around the A axis of a negative value means that the torque for maintaining the angle θa acted. In general putting, the wrist angle is almost fixed. Due to this fixation, the angle θa is not altered so much in putting. The torque for maintaining the angle θa acts around the A axis. Additionally, the angle θa is likely to approximate to 180 degrees due to the centrifugal force in the swing. Accordingly, this centrifugal force causes a torque in a direction to increase the angle θa. The torque Ta around the A axis has a negative value in attempts to maintain the angle θa contrary to this torque. In FIG. 15A, the torque Ta around the A axis greatly varies depending on the different golf clubs. This is believed to be led from the difference for each golf club in the rotation moment around the A axis that results from the gravity of the golf club 8, and in addition, led from the difference for each golf club in the rotation moment around the A axis that results from the centrifugal force that acts on the golf club 8. Accordingly, in calculating the torque in this embodiment, the gravity that acts on the golf club is considered. In the calculation of the torque according to this embodiment, balance of static force and dynamic force in the link model is considered. In this embodiment, the calculated torque is the torque that acts between the first link L1 and the second link L2. Thus, the torque according to the present invention can provide beneficial information which could not be provided by conventional analyses.

As shown in the foregoing Examples, different torques may be attained resulting from the difference of the golf players. Additionally, different torques may be attained resulting from the difference of the swing in each shot. Moreover, different torques may be attained resulting from the golf club. Also, correlation of the torque with the result of hitting is revealed. It has been known that the golf swing is greatly affected by psychological factors. The swing can be also altered due to the psychological influence imparted from the golf club. It is also assumed that the torque applied by the golf player to the golf club may vary due to the sense of anxiety caused from the visual effects. The results of the torque can also suggest, for example, the psychological influences on the golf player. Accordingly, the analysis of the present invention is distinct from the conventional analyses in which the state of the golf club is merely determined. The torque according to the present invention can be utilized in analyses of golf clubs, and furthermore, it can be widely used for the method of diagnosing a swing, the method of selecting a golf club, the method of designing a golf club, and the like.

The present invention can be applied to any of golf clubs including wood type golf clubs, iron type golf clubs, putter clubs and the like. Further, the present invention can be applied to a method of diagnosing a swing, a method of selecting a golf club, method of designing a golf club, and the like.

The description hereinabove is merely for an illustrative example, and various modifications can be made in the scope not to depart from the principles of the present invention.

What is claimed is:

1. A method of analyzing a golf club, diagnosing a swing, selecting a golf club, or designing a golf club, comprises:
    performing a time-series analysis of a torque that acts on a joint during the swing when modeling using the golf club, and at least a part of a golf player who grips a grip member of the golf club to provide a link model in which the golf club is connected with the golf player via the joint; and
    using gravity that acts on the golf club in calculation of the torque,
    wherein the time-series analysis of the torque that acts on the joint during the swing when modeling using the golf club is performed by a computer having a CPU (central processing unit), and
    wherein an axis of the torque to be analyzed include an A axis that is parallel to a ground and is oriented to a target direction, a B axis that is in a direction of a shaft axis of the golf club in addressing, or a C axis that is parallel to the ground and is perpendicular to the A axis.

2. The method of claim 1, further comprising comparing a result of hitting achieved by the golf player aiming at a target, with a result of the time-series analysis of the torque applied from the golf player to the golf club during the swing in the hitting.

3. The method of claim 1, further comprising comparing a predetermined optimum torque curve with an observed torque curve obtained by a result of the time-series analysis of the torque applied from the golf player to the golf club during the swing.

4. The method of claim 1, further comprising:
    hitting multiple golf clubs to obtain a result of the time-series analysis of the torque applied from the golf player to each of the golf clubs, thereby deriving a torque curve for each of the golf clubs based on the result for each of the golf clubs; and
    comparing a predetermined optimum torque curve with the torque curves for each of the golf clubs, respectively, to select an optimum golf club from among the multiple golf clubs.

5. The method of claim 1, further comprising:
    hitting multiple golf clubs by multiple golf players, respectively, to obtain a result of the time-series analysis of the torque applied from each of the golf players to each of the golf clubs, thereby obtaining multiple observed torque curves based on the results for the golf players to each of the golf clubs;
    evaluating the observed torque curve using at least one of the multiple observed torque curves; and
    designing a golf club based on the evaluation result.

6. The method of claim 1, wherein the golf club is a putter club, and the link model is the two-link model or the three-link model.

7. The method of claim 6, wherein the link model is the two-link model.

8. The method of claim 1, wherein the link model is a two-link model having two lines in total, a three-link model having three lines in total, a four-link model having four lines in total, or a five-link model having five lines in total.

9. A method of analyzing a golf club, diagnosing a swing, selecting a golf club, or designing a golf club, comprises:
    performing a time-series analysis of a torque that acts on a joint during the swing when modeling using the golf club, and at least a part of a golf player who grips a grip member of the golf club to provide a link model in which the golf club is connected with the golf player via the joint; and
    using gravity that acts on the golf club in calculation of the torque,
    wherein the time-series analysis of the torque that acts on the joint during the swing when modeling using the golf club is performed by a computer having a CPU (central processing unit), wherein the link model contains a human body-corresponding link, a club-corresponding link, and a joint connecting the human body-corresponding link and the club-corresponding link, and wherein the torque contains a torque for maintaining an angle between the human body-corresponding link and the club-corresponding link, wherein an axis of the torque to be analyzed include an A axis that is parallel to a ground and is oriented to a target direction, a B axis that is in a direction of a shaft axis of the golf club in addressing, or a C axis that is parallel to the ground and is perpendicular to the A axis.

* * * * *